US012038713B2

(12) United States Patent
Okino et al.

(10) Patent No.: US 12,038,713 B2
(45) **Date of Patent: *Jul. 16, 2024**

(54) DEVELOPER SUPPLY CONTAINER AND DEVELOPER SUPPLYING SYSTEM

(71) Applicant: CANON KABUSHIKI KAISHA, Tokyo (JP)

(72) Inventors: Ayatomo Okino, Moriya (JP); Hiromasa Katayama, Tokyo (JP); Nobuyuki Yomoda, Kashiwa (JP); Masato Yamaoka, Kashiwa (JP); Akihito Kamura, Nagareyama (JP); Koji Katayama, Misato (JP); Tsukasa Mine, Tsukuba (JP); Katsuya Murakami, Toride (JP); Keisuke Isobe, Tokyo (JP); Shogo Yamasaki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,279

(22) Filed: Sep. 15, 2022

(65) Prior Publication Data

US 2023/0019635 A1 Jan. 19, 2023

Related U.S. Application Data

(60) Division of application No. 17/089,839, filed on Nov. 5, 2020, now Pat. No. 11,480,913, which is a division (Continued)

(30) Foreign Application Priority Data

Sep. 21, 2017 (JP) ................................ 2017-181801

(51) Int. Cl.

*G03G 21/16* (2006.01)
*G03G 15/08* (2006.01)

(52) U.S. Cl.

CPC ......... *G03G 21/1647* (2013.01); *G03G 15/08* (2013.01); *G03G 15/0812* (2013.01); *G03G 15/0867* (2013.01); *G03G 21/1676* (2013.01)

(58) Field of Classification Search

CPC ........... G03G 15/0812; G03G 15/0867; G03G 21/1647; G03G 21/1676

See application file for complete search history.

(56) References Cited

U.S. PATENT DOCUMENTS 3,998,537 A 12/1976 Smith et al.
5,500,719 A 3/1996 Ichikawa et al.

(Continued)

FOREIGN PATENT DOCUMENTS

CN 1062795 A 7/1992
CN 2606378 A 11/2007

(Continued)

OTHER PUBLICATIONS

International Search Report and Written Opinion for International Patent Application No. PCT/JP2018/036621, dated Nov. 27, 2018.

(Continued)

*Primary Examiner* — Gregory H Curran
(74) *Attorney, Agent, or Firm* — Venable LLP

(57) ABSTRACT

There are provided a developer accommodating portion for accommodating the developer, a discharge portion formed with a discharge opening for discharging the developer accommodated in the developer accommodating portion, and an engaging portion 30. The engaging portion 30 is engaged with an engaged portion 11*b* with a mounting operation of a developer supply container 1 to displace a developer receiving portion 11 in an upward direction U so that the receiving opening communicates with the discharge opening. The engaging portion 30 has a holding portion 31 which is provided rotatably about a rotation shaft 41 and is (Continued)

provided with holding portion 21 to be engaged with the engaged portion 11*b* to hold the engaged portion 11*b*. With the mounting operation, the engaging portion 30 rotates about the rotation shaft 41 so that the engaged portion 11*b* held by the holding portion 31 moves upward U.

10 Claims, 20 Drawing Sheets

Related U.S. Application Data of application No. 16/354,227, filed on Mar. 15, 2019, now Pat. No. 10,884,371, which is a continuation of application No. PCT/JP2018/036621, filed on Sep. 21, 2018.

(56) References Cited

U.S. PATENT DOCUMENTS

| | | | |
|---|---|---|---|
| 5,848,338 | A | 12/1998 | Okada |
| 6,049,685 | A | 4/2000 | Murakami et al. |
| 6,128,453 | A | 10/2000 | Ban et al. |
| 6,278,853 | B1 | 8/2001 | Ban et al. |
| RE38,737 | E | 5/2005 | Ban et al. |
| 7,050,728 | B2 | 5/2006 | Minagawa et al. |
| 7,242,893 | B2 | 7/2007 | Murakami et al. |
| 7,738,818 | B2 | 6/2010 | Murakami et al. |
| 7,741,757 | B2 | 8/2010 | Kim et al. |
| 8,000,614 | B2 | 8/2011 | Okino et al. |
| 9,229,364 | B2 | 1/2016 | Murakami et al. |
| 9,348,261 | B2 | 5/2016 | Enokuchi et al. |
| 9,354,549 | B1 | 5/2016 | Okino et al. |
| 9,383,686 | B2 | 7/2016 | Murakami |
| 9,529,299 | B2 | 12/2016 | Okino et al. |
| 9,535,369 | B2 | 1/2017 | Kamura et al. |
| 9,588,461 | B2 | 3/2017 | Kamura et al. |
| 9,632,455 | B2 | 4/2017 | Murakami et al. |
| 9,720,349 | B2 | 8/2017 | Yamaoka et al. |
| 9,760,059 | B2 | 9/2017 | Katayama |
| 9,811,024 | B2 | 11/2017 | Yomoda et al. |
| 10,088,773 | B2 | 10/2018 | Yamaoka et al. |
| 10,088,775 | B2 | 10/2018 | Kamura et al. |
| 10,133,211 | B2 | 11/2018 | Yomoda |
| 10,209,667 | B2 | 2/2019 | Jimba et al. |
| 10,289,060 | B2 | 5/2019 | Jimba et al. |
| 10,295,957 | B2 | 5/2019 | Jimba et al. |
| 10,488,814 | B2 | 11/2019 | Jimba et al. |
| 10,496,032 | B2 | 12/2019 | Jimba et al. |
| 10,514,654 | B2 | 12/2019 | Jimba et al. |
| 10,520,881 | B2 | 12/2019 | Jimba et al. |
| 10,678,165 | B2 | 6/2020 | Murakami et al. |
| 10,761,474 | B2 | 9/2020 | Yamaoka et al. |
| 2002/0044795 | A1 | 4/2002 | Hibino |
| 2002/0127029 | A1 | 9/2002 | Yamada et al. |
| 2004/0265012 | A1 | 12/2004 | Hasebe |
| 2007/0092302 | A1 | 4/2007 | Koyama |
| 2007/0223970 | A1 | 9/2007 | Kawai |
| 2008/0170880 | A1 | 7/2008 | Hashimoto |
| 2009/0129825 | A1 | 5/2009 | Okino et al. |
| 2009/0297226 | A1 | 12/2009 | Nagashima et al. |
| 2012/0134720 | A1 | 5/2012 | Nagashima et al. |
| 2012/0200871 | A1 | 8/2012 | Takahashi et al. |
| 2013/0121731 | A1 | 5/2013 | Takashima |
| 2013/0209140 | A1 | 8/2013 | Murakami et al. |
| 2014/0153974 | A1 | 6/2014 | Jimba et al. |
| 2015/0010334 | A1 | 1/2015 | Nakagima |
| 2015/0248102 | A1 | 9/2015 | Nakajima |
| 2016/0004186 | A1 | 1/2016 | Jimba et al. |
| 2016/0070202 | A1 | 3/2016 | Murakami et al. |
| 2016/0209803 | A1 | 7/2016 | Katayama |
| 2016/0223981 | A1 | 8/2016 | Enokuchi et al. |
| 2017/0176891 | A1 | 6/2017 | Chuang et al. |
| 2017/0176924 | A1 | 6/2017 | Murakami et al. |
| 2017/0242367 | A1 | 8/2017 | Jimba et al. |
| 2017/0351212 | A1 | 12/2017 | Enokuchi et al. |
| 2018/0024465 | A1 | 1/2018 | Yomoda et al. |
| 2018/0101127 | A1 | 4/2018 | Jimba et al. |
| 2018/0107151 | A1 | 4/2018 | Jimba et al. |
| 2019/0018340 | A1 | 1/2019 | Yamaoka et al. |
| 2019/0018341 | A1 | 1/2019 | Yamaoka et al. |
| 2019/0155208 | A1 | 5/2019 | Jimba et al. |
| 2019/0204778 | A1 | 7/2019 | Gamo et al. |
| 2019/0212672 | A1 | 7/2019 | Gamo et al. |
| 2019/0212694 | A1 | 7/2019 | Katayama et al. |
| 2019/0212695 | A1 | 7/2019 | Makino et al. |

FOREIGN PATENT DOCUMENTS

| | | | |
|---|---|---|---|
| CN | 101080677 | A | 11/2007 |
| CN | 101107576 | A | 1/2008 |
| DE | 10 2006 061 874 | A1 | 9/2007 |
| EP | 2 720 088 | A | 4/2014 |
| JP | H09-269643 | A | 10/1997 |
| JP | 2000-321872 | A | 11/2000 |
| JP | 2001-222158 | A | 8/2001 |
| JP | 2003-280344 | A | 10/2003 |
| JP | 3869993 | B2 | 1/2007 |
| JP | 2007-041104 | A | 2/2007 |
| JP | 2010-117604 | A | 5/2010 |
| JP | 2013-015826 | A | 1/2013 |
| JP | 2015-200911 | A | 11/2015 |
| JP | 2016-033533 | A | 3/2016 |
| JP | 2016-199234 | A | 12/2016 |
| KR | 10-2009-0038184 | A | 4/2009 |
| KR | 10-2014-0041599 | A | 4/2014 |
| RU | 2628667 | C2 | 8/2017 |
| RU | 2629649 | C2 | 8/2017 |
| SU | 654196 | A3 | 3/1979 |
| WO | 2008/072757 | A1 | 6/2008 |

OTHER PUBLICATIONS

Nov. 19, 2020 Office Action in Eurasian Patent Application No. 202090780 (with English translation).
Jan. 22, 2021 Office Action in Korean Patent Application No. 10-2020-7010438.
Apr. 30, 2021 Office Action in Russian Patent Application No. 2020141429 (with English translation).
May 10, 2021 Office Action in Indian Patent Application No. 202047015919.
May 27, 2021 Office Action in Canadian Patent Application No. 3,076,606.
May 27, 2021 Extended Search Report in European Patent Application No. 18 85 9912.
Aug. 9, 2021 Office Action in German Patent Application No. 11 2018 004 234.0 (with English translation).
Oct. 19, 2021 Notice of Allowance in Korean Patent Application No. 10-2020-7010438.
Jul. 20, 2022 Office Action in Chinese Patent Application No. 201880060148.0.
Jul. 22, 2022 Office Action in Korean Patent Application No. 10-2022-7019912.
Aug. 16, 2022 Examination Report in Australian Patent Application No. 2021212042.
Mar. 11, 2022 Notice of Allowance in Korean Patent Application No. 10-2022-7001910.
Dec. 17, 2021 Office Action in Chinese Patent Application No. 201880060148.0 (with English translation).
Notice of Acceptance dated Oct. 16, 2020 in counterpart Russian Application No. 020113691/28, together with English translation thereof.
Machine Translation of JP-2001-222158A obtained Aug. 24, 2021 (Year: 2001).
Apr. 3, 2023 Notice of Allowance in Korean Patent Application No. 10-2022-7019912.
Feb. 23, 2023 Communication in European Patent Application No. 18 859 912.0.
Jan. 9, 2023 Examination Report in Malaysian Patent Application No. PI2020001412.

(56) References Cited

OTHER PUBLICATIONS

Dec. 5, 2023 Office Action in Japanese Patent Application No. 2023-020901.
Aug. 25, 2023 Notice of Allowance in Korean Patent Application No. 10-2023-7022461.
May 2, 2024 Examination Report in Australian Patent Application No. 2023214387.

(a)

(b)

(a)

(b)

(c)

(a)

(b)

(a)

(b)

(a)

(b)

(a)

(b)

(c)

(a)

(b)

(a)

(b)

(a)

(b)

(a)

(b)

(a)

(b)

DEVELOPER SUPPLY CONTAINER AND DEVELOPER SUPPLYING SYSTEM

TECHNICAL FIELD

The present invention relates to a developer supply container dismountably mountable to a developer receiving apparatus and a developer supplying system.

BACKGROUND ART

Conventionally, in electrophotographic image forming apparatuses such as copying machines, fine developing powder such as toner has been used. In such an image forming apparatus, the developer consumed by the image formation is supplemented from a developer supply container.

For example, a structure has been proposed in which the developer supply container is mountable to and dismountable from a developer receiving apparatus provided in the image forming apparatus, and the developer receiving portion of the developer receiving apparatus is displaced toward the discharge opening of the developer supply container in accordance with the mounting operation of the developer supply container (JP2013-015826A).

SUMMARY OF THE INVENTION

Problems to be Solved by the Invention

An object of the present invention is to provide a developer supply container and a developer supplying system capable of improving easiness of operation by reducing the operation force when mounting the developer supply container.

Means for Solving the Problem

According to an aspect of the present invention, there is provided a developer supply container detachably mountable to a developer receiving device, the developer receiving device including a developer receiving portion provided with a receiving opening for receiving a developer and an engaged portion integrally displaceable with the developer receiving portion, said developer supply container comprising a rotatable developer accommodating portion for accommodating the developer; a discharging portion including a discharge opening for discharging the developer accommodated in said developer accommodating portion; and an engaging portion provided with a recess which is rotatable with the engaged portion engaged with said recess with a mounting operation of said developer supply container so as to displace the developer receiving portion in a displacing portion to bring the receiving opening and said discharge opening into fluid communication with each other.

Effect of the Invention

According to the present invention, it is possible to improve the operativity by reducing the operating force when mounting the developer supply container.

Figure 3:
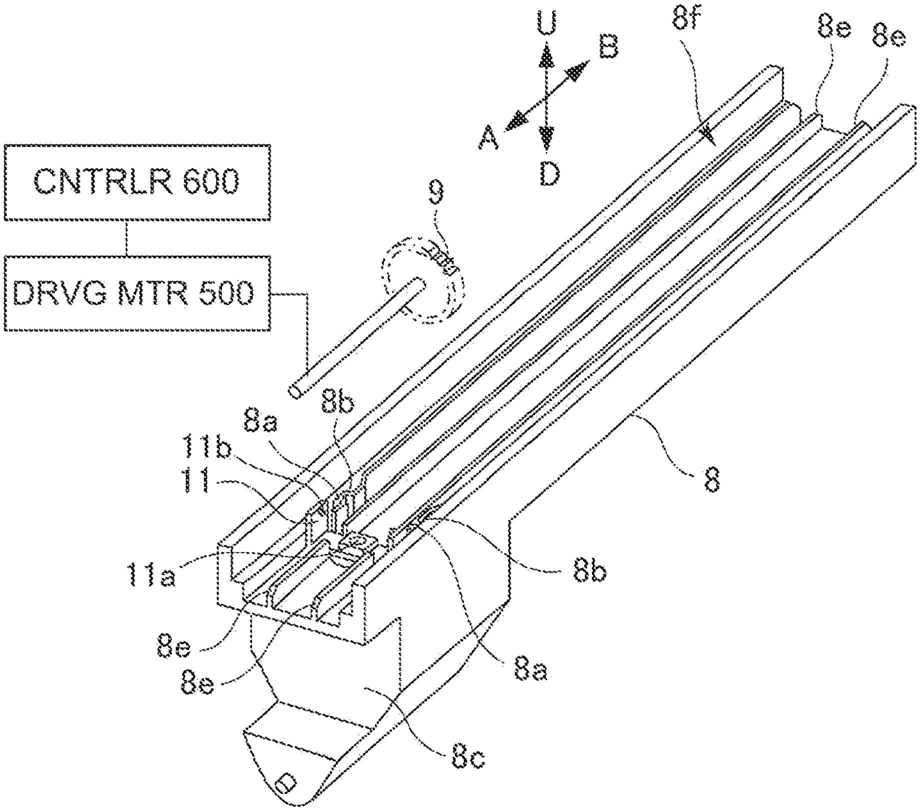
Figure 3:
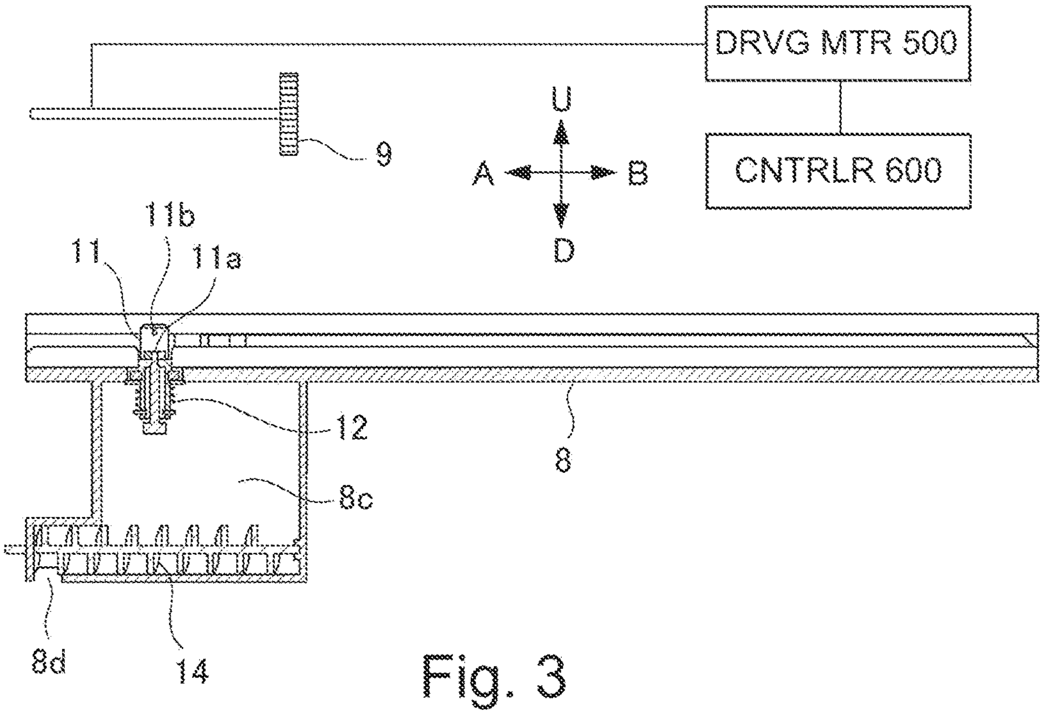

Parts (a) and (b) of FIG. 3 show a developer receiving apparatus according to Embodiment 1, in which part (a) is a perspective view thereof, and part (b) is a cross-sectional view thereof.

Figure 4:
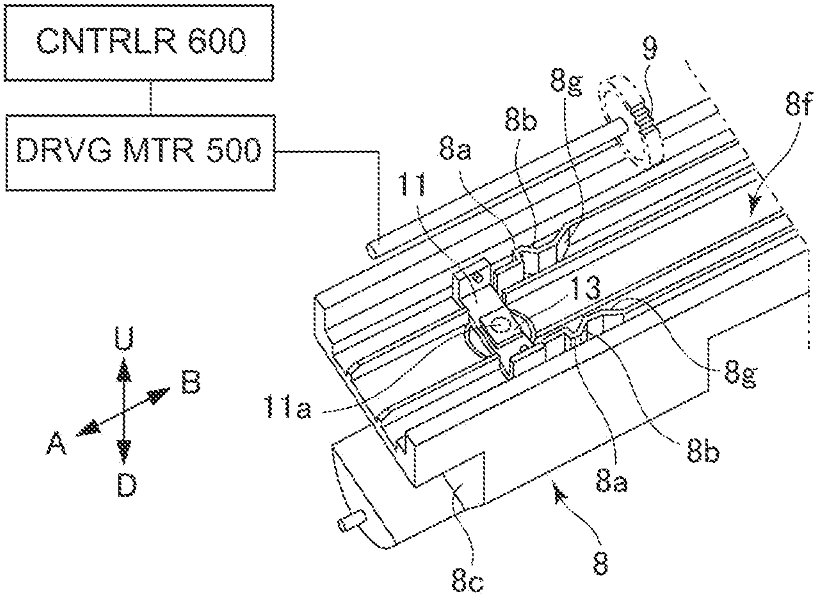
Figure 4:
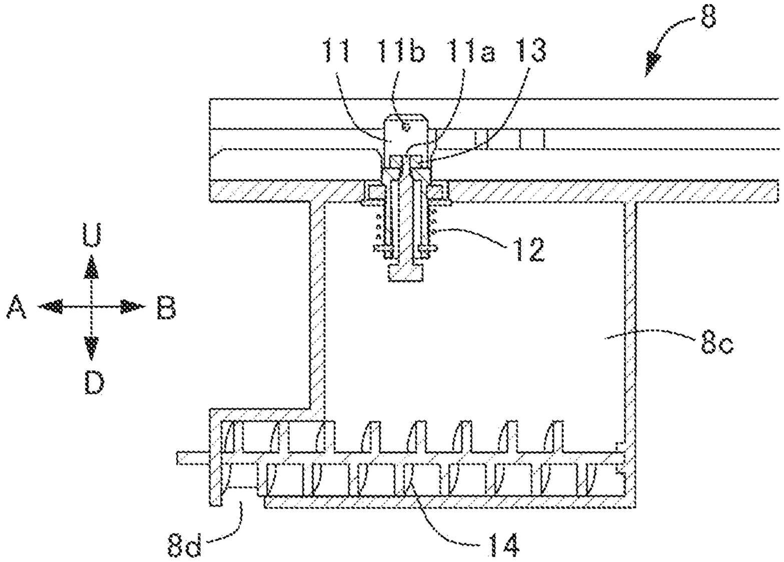
Figure 4:
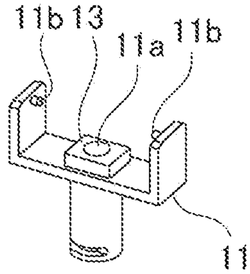

Parts (a), (b) and (c) of FIG. 4 show a developer receiving apparatus according to Embodiment 1, in which part (a) is an enlarged partial perspective view thereof, part (b) is an enlarged cross sectional view thereof, and part (c) is a perspective view of a developer receiving portion.

Figure 5:
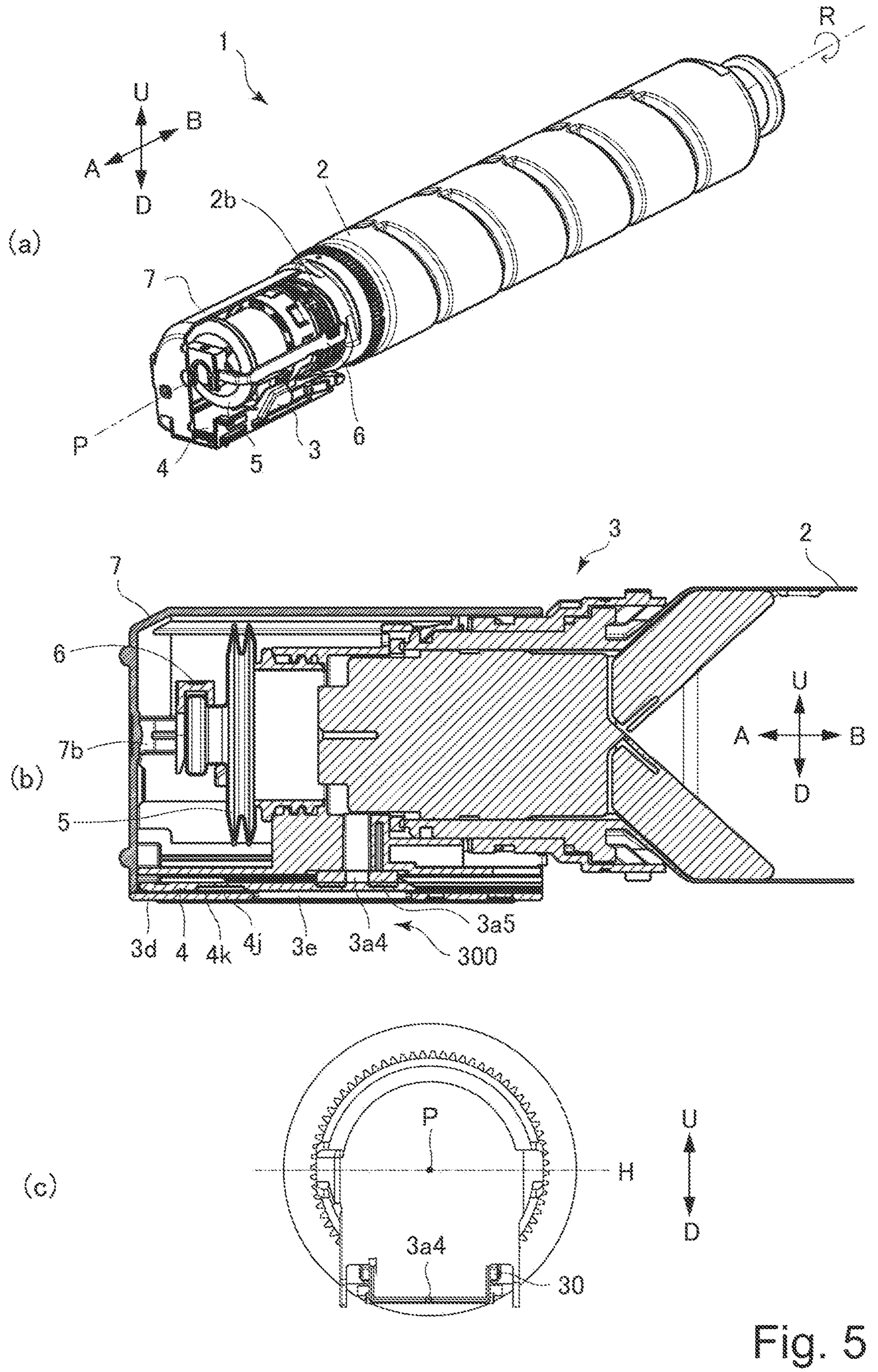

Parts (a), (b) and (c) of FIG. 5 show a developer supply container according to Embodiment 1, in which part (a) is a partially cut-away perspective view, part (b) is a cross-sectional view thereof around a flange portion, and (c) is a front elevational view thereof as viewed from a front side.

Figure 6:
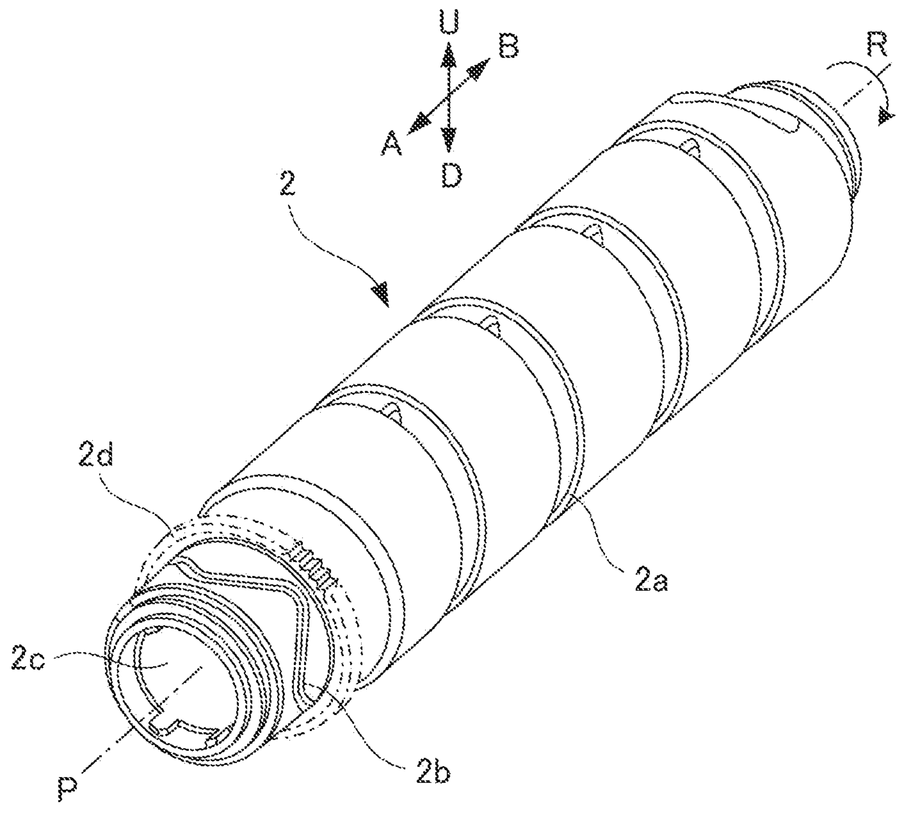

FIG. 6 is a perspective view of the container main body of the developer supply container according to Embodiment 1.

Figure 7:
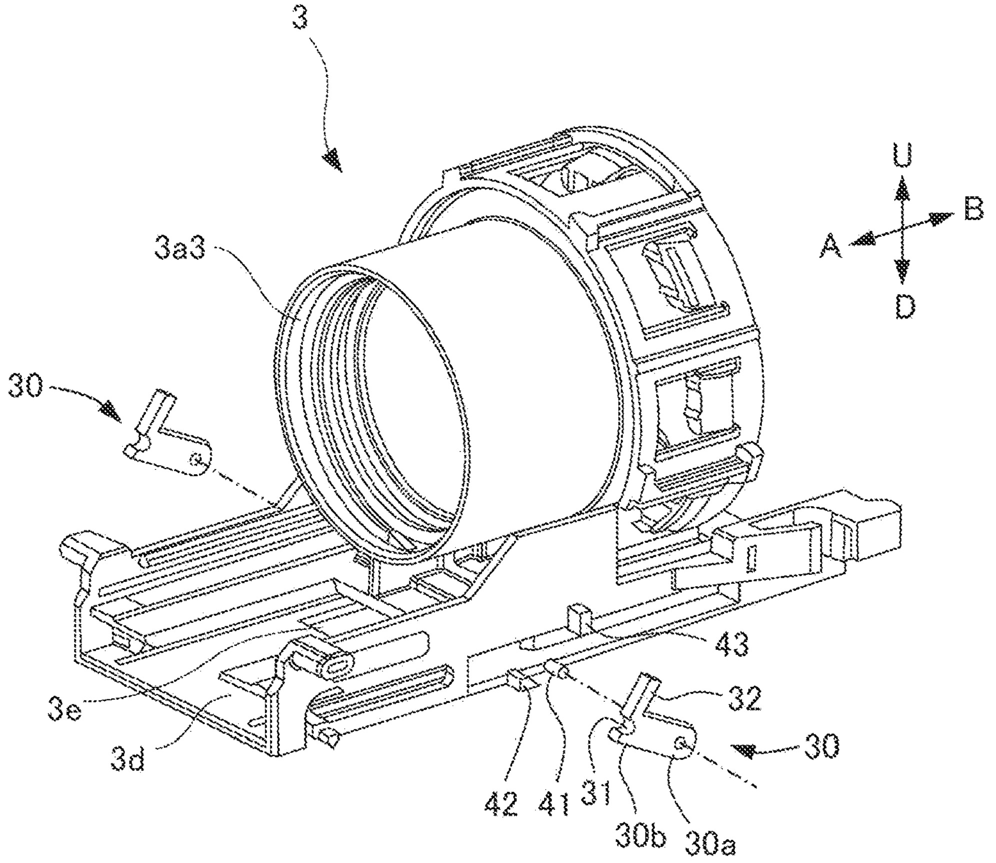
Figure 7:
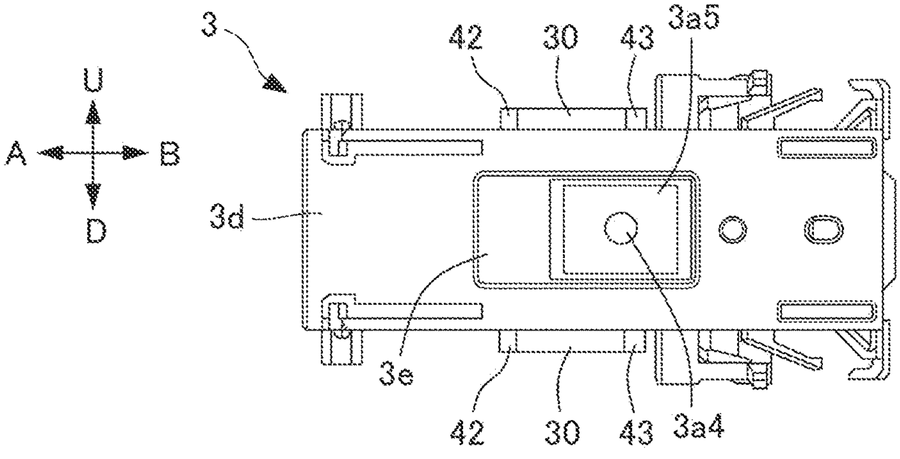

Parts (a) and (b) of FIG. 7 show a flange portion in Embodiment 1, in which part (a) is a perspective view thereof, and (b) is a bottom view thereof.

Figure 8:
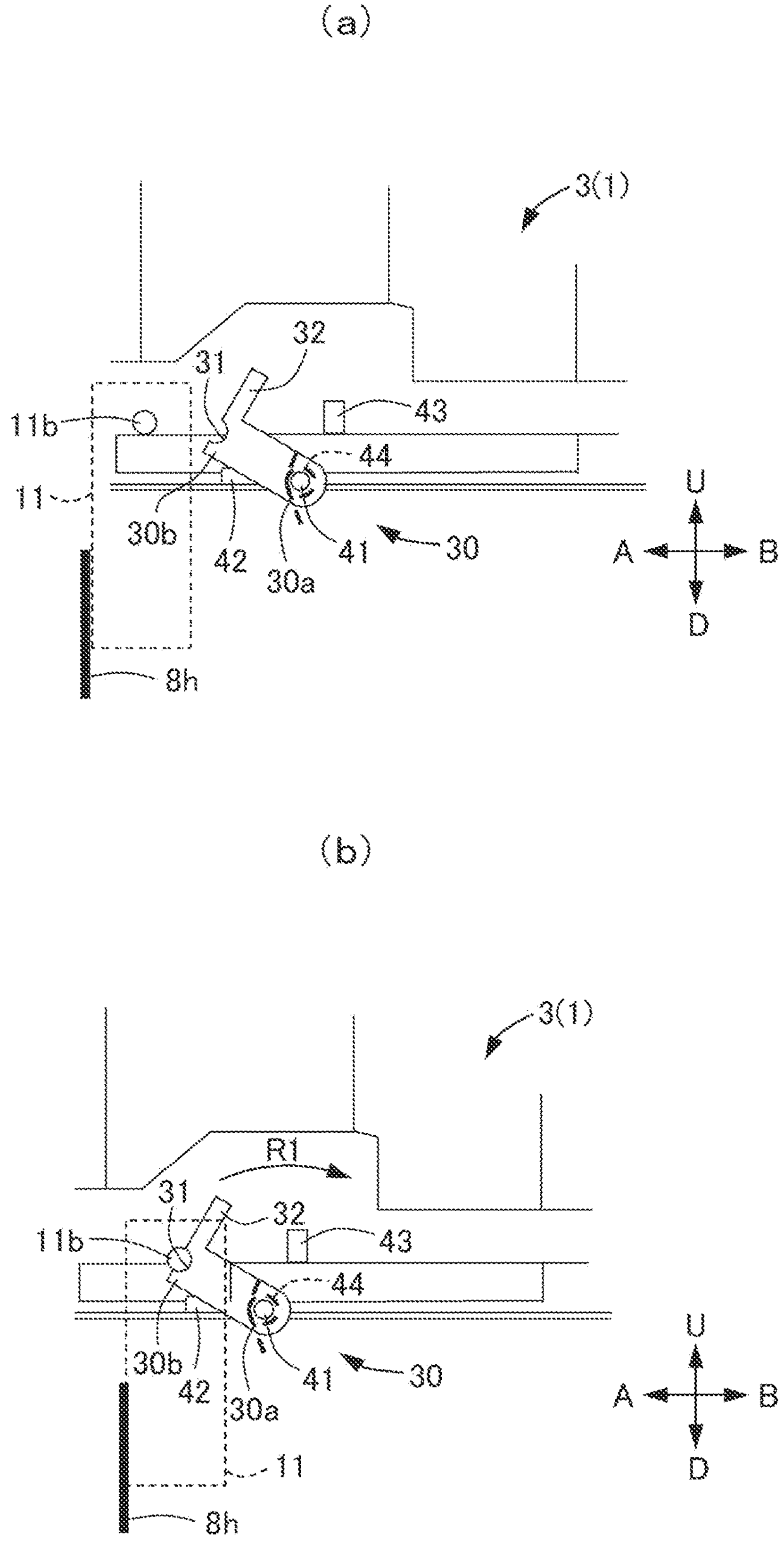

Parts (a) and (b) of FIG. 8 show a state of an engaging portion in Embodiment 1, in which part (a) is a side view of the developer supply container when insertion of the developer supply container is started, and part (b) is a side view when an engaged portion (portion to be engaged) is held by a holding portion as the developer supply container is inserted.

Figure 9:
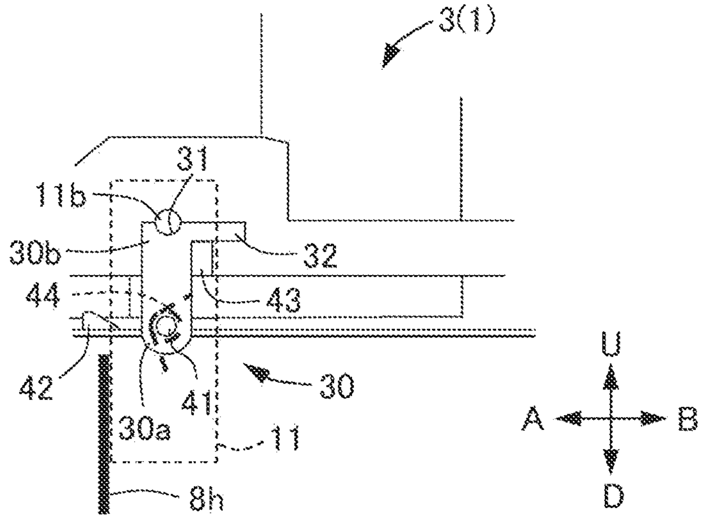
Figure 9:
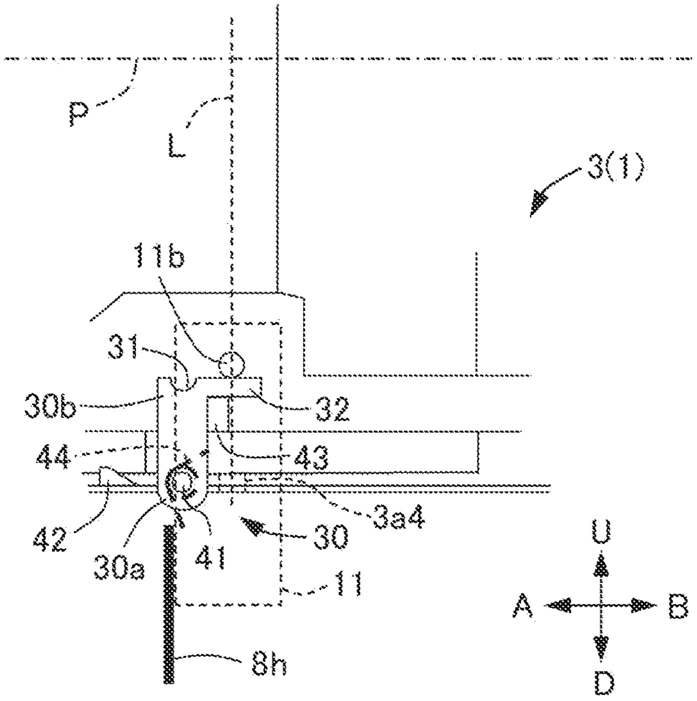

Parts (a) and (b) of FIG. 9 illustrate a state of the engaging portion in Embodiment 1, in which (a) is a side view when the engaging portion is positioned at a second gripping position, (b) is a side view when the engaged portion is positioned at an extended portion as the developer supply container is completely mounted.

Figure 10:
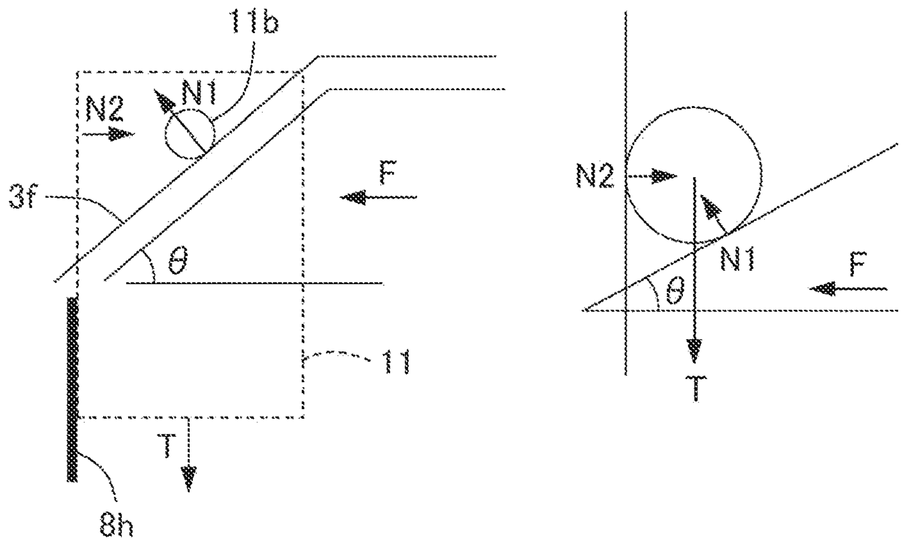
Figure 10:
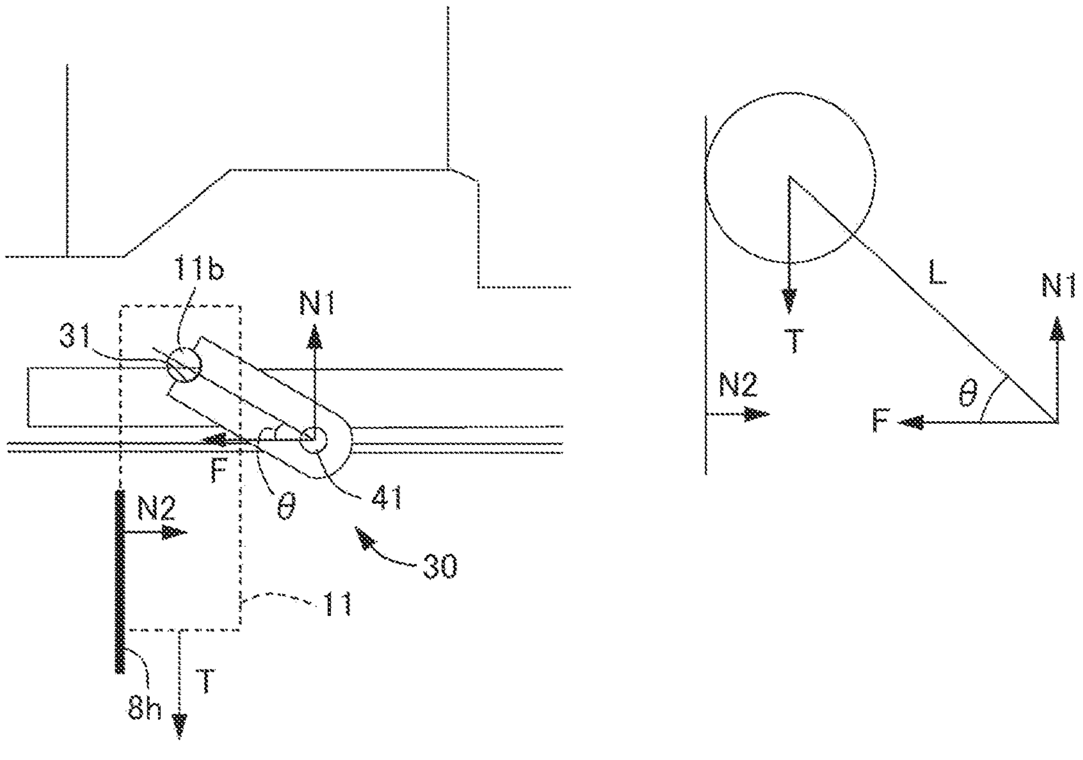

Parts (a) and (b) of FIG. 10 are schematic illustration of the forces acting on the developer receiving portion during the loading operation of the developer supply container, in which part (a) shows a comparison example, part (b) shows Embodiment 1.

Figure 11:
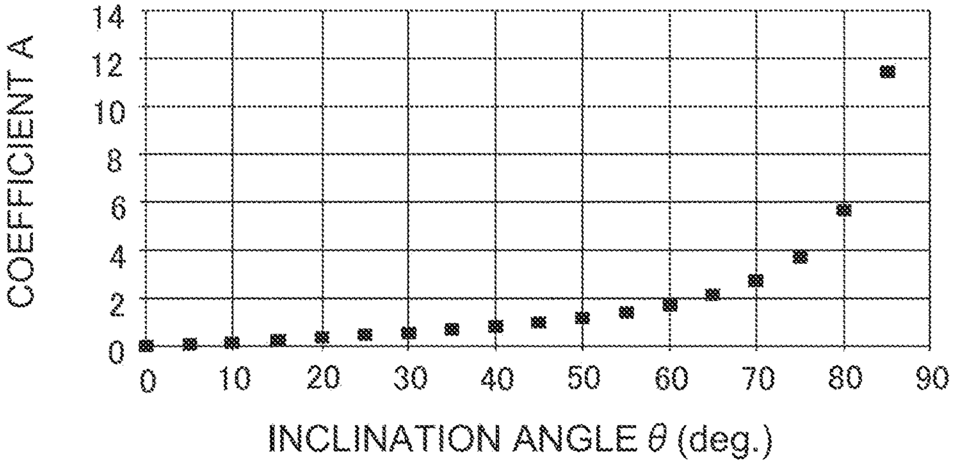
Figure 11:
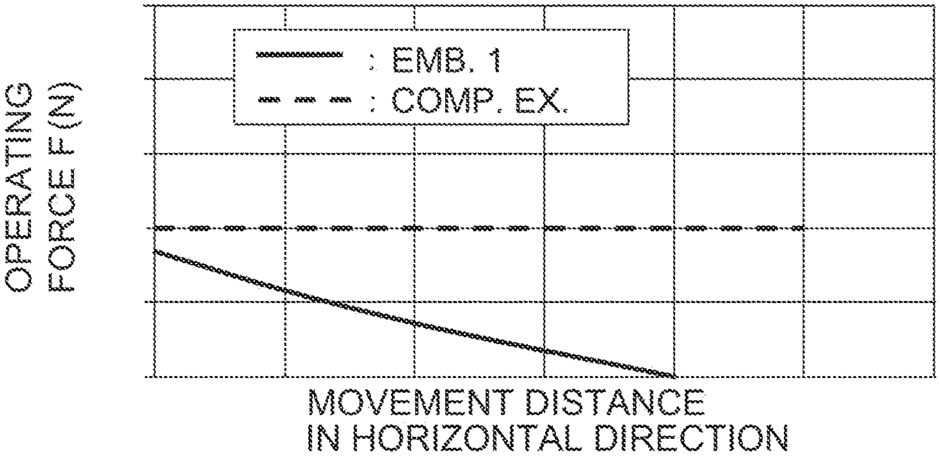
Figure 11:
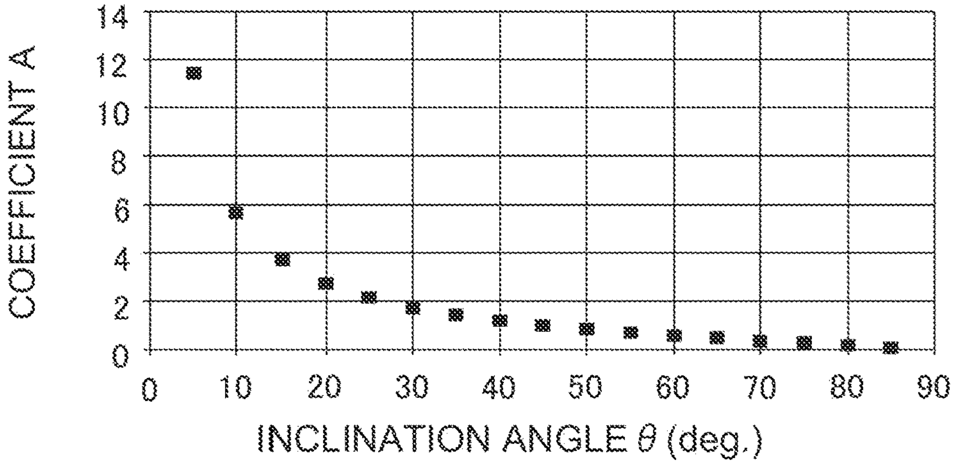

Part (a) of FIG. 11 is a graph showing a relationship between the inclination angle and a coefficient An in a comparative example, and part (b) of FIG. 11 is a graph showing a relationship between a moving distance in the horizontal direction Ad an operating force F, and part (c) of FIG. 11 is a graph showing a relationship between an inclination angle and a coefficient An in Embodiment 1.

Figure 12:
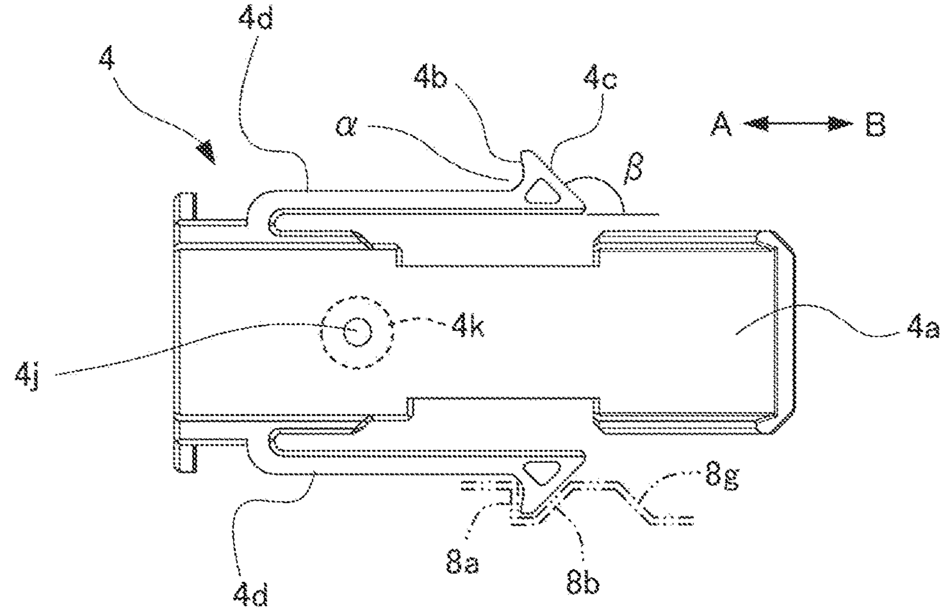
Figure 12:
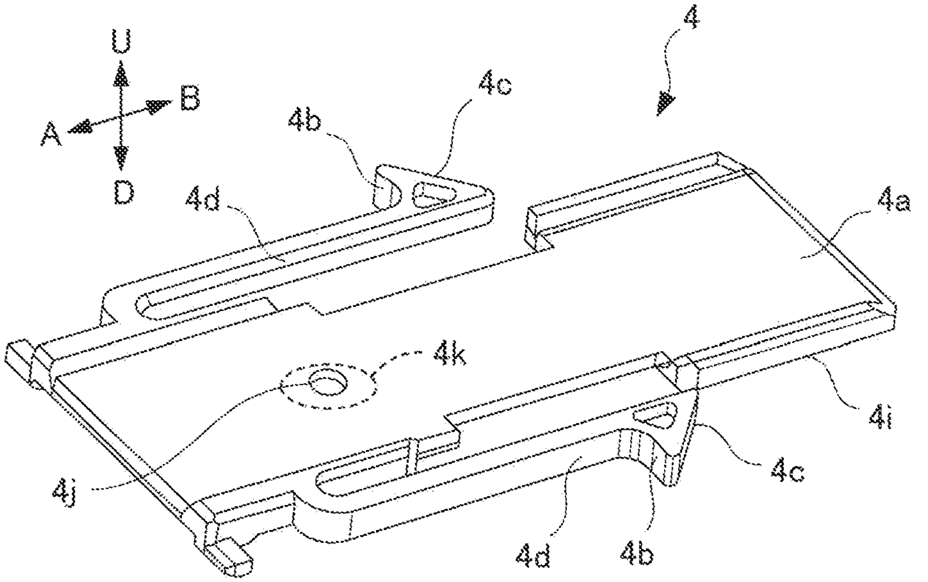

Parts (a) and (b) of FIG. 12 illustrate a shutter in Embodiment 1, in which part (a) is a top plan view thereof, and part (b) is a perspective view thereof.

Figure 13:
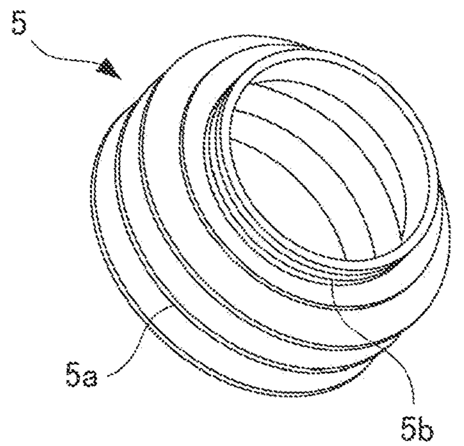
Figure 13:
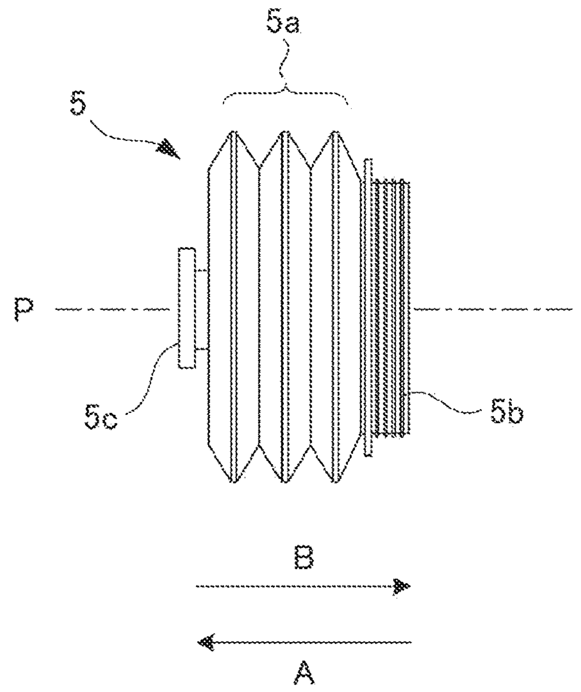

Parts (a) and (b) of FIG. 13 illustrate a pump in Embodiment 1, in which part (a) is a perspective view thereof, and part (b) is a side view thereof.

Figure 14:
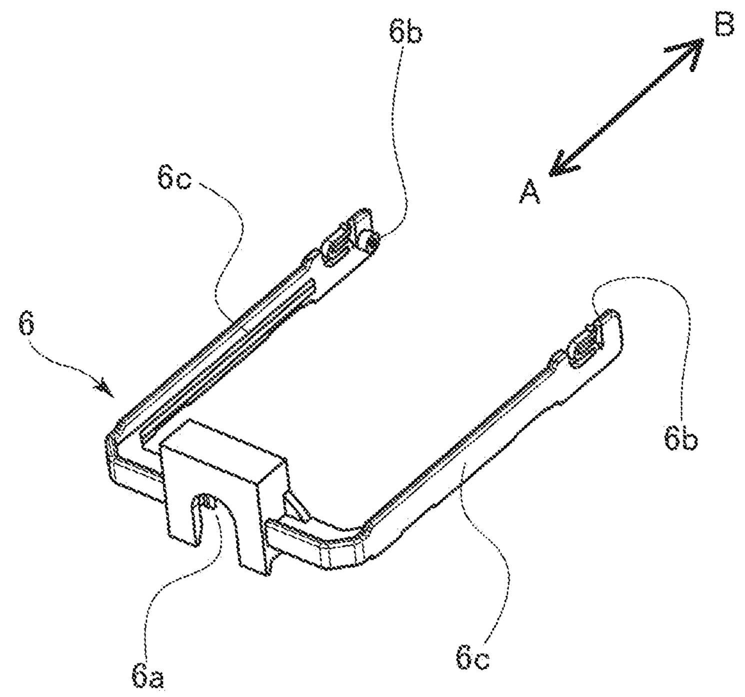
Figure 14:
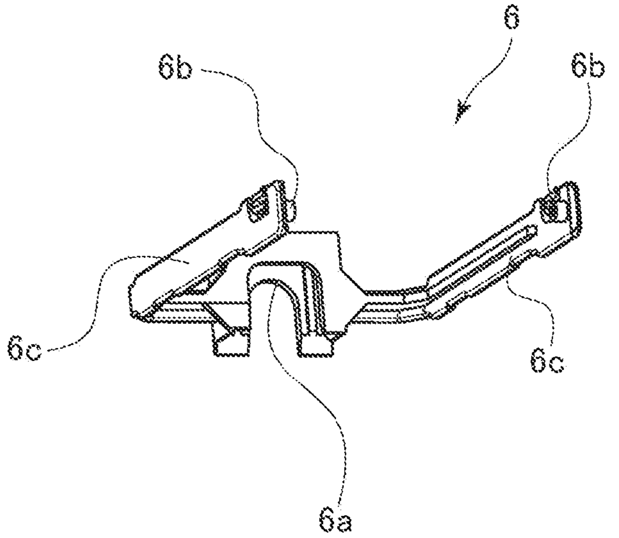

Parts (a) and (b) of FIG. 14 illustrate a reciprocating member in Embodiment 1, in which part (a) is a perspective view thereof, and part (b) is a perspective view thereof as seen from the opposite side of part (a).

Figure 15:
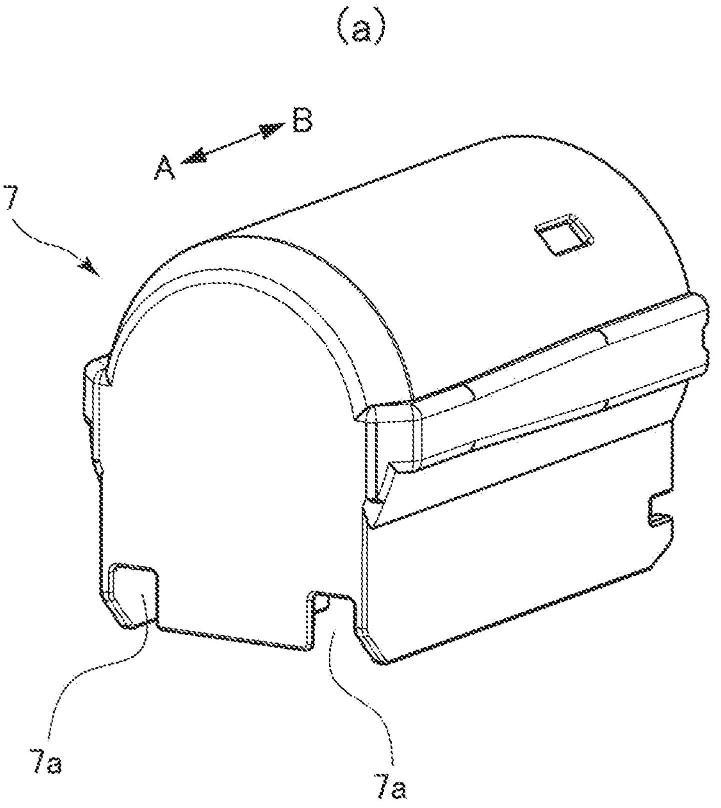
Figure 15:
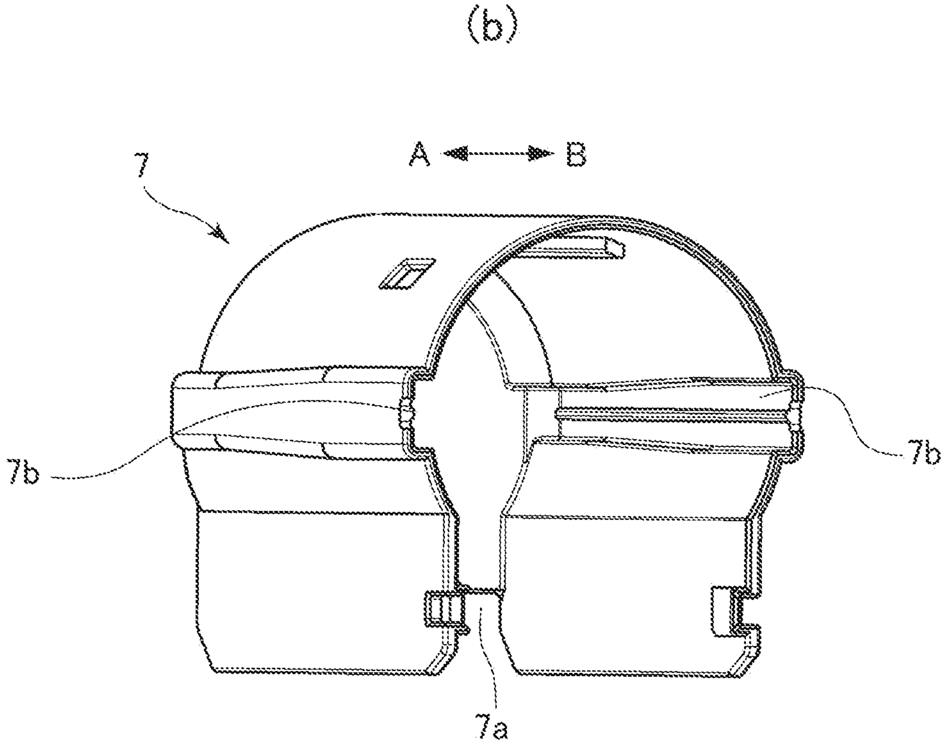

Parts (a) and (b) of FIG. 15 illustrate a cover according to Embodiment 1, in which part (a) is a perspective view thereof, and part (b) is a perspective view thereof from the opposite side of part (a).

Figure 16:
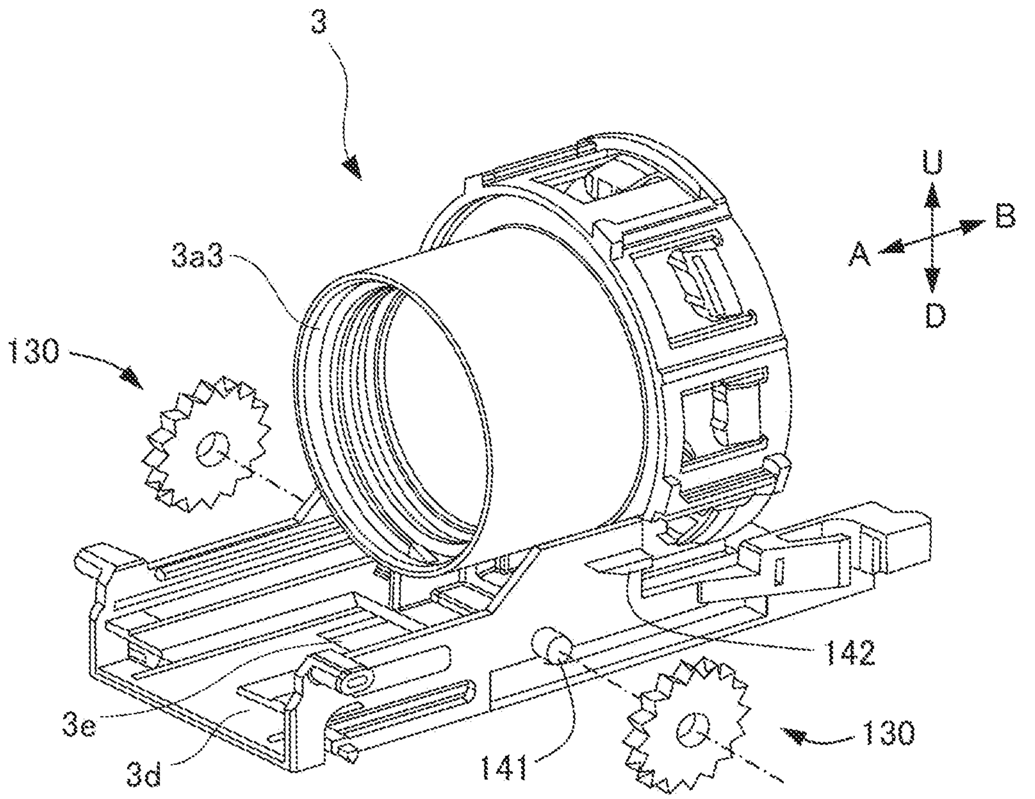
Figure 16:
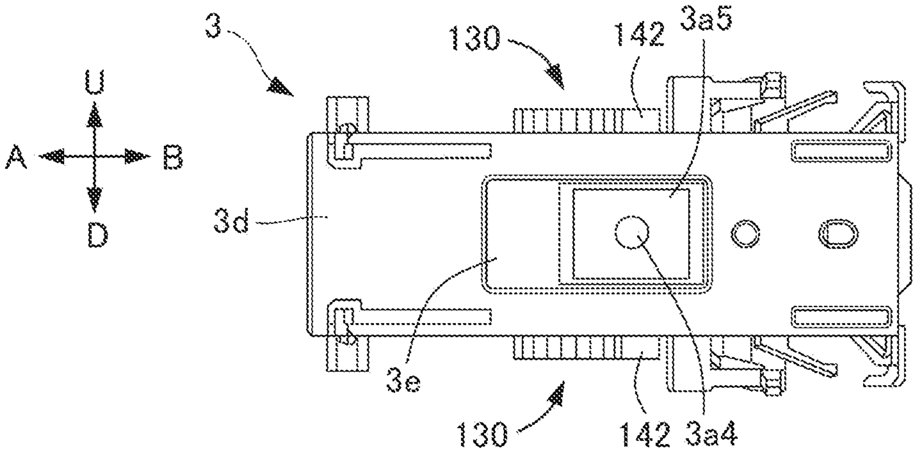

Parts (a) and (b) of FIG. 16 illustrate a flange in Embodiment 2, in which part (a) is a perspective view thereof, and part (b) is a bottom view thereof.

Figure 17:
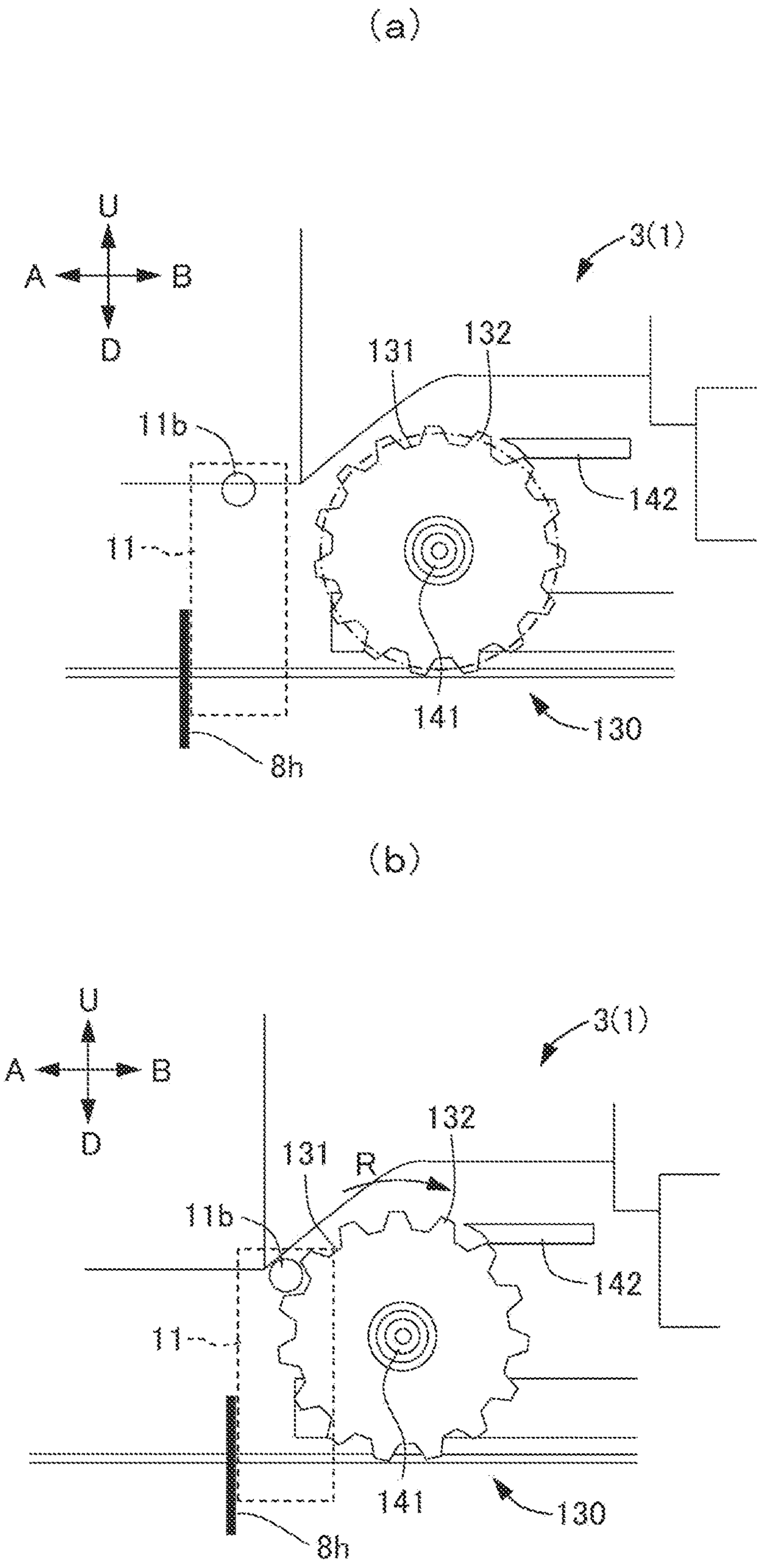

Parts (a) and (b) of FIG. 17 illustrate an engaging portion in Embodiment 2, in which part (a) is a side view when insertion of the developer supply container is started, and part (b) is a side view when an engaged portion (portion to be engaged) is held by a holding portion as the developer supply container is inserted.

Figure 18:
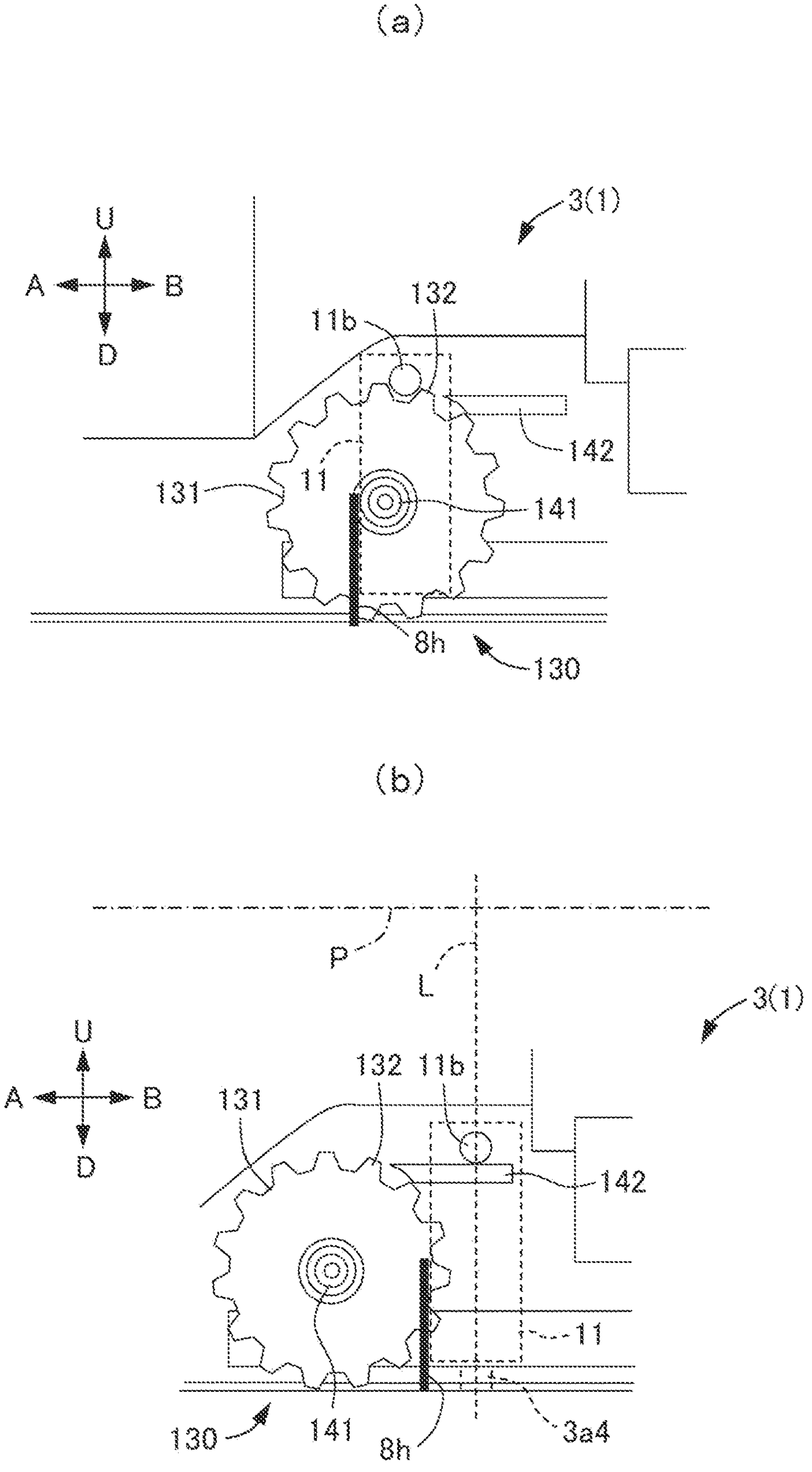

Parts (a) and (b) of FIG. 18 illustrate an engaging portion according to Embodiment 2, in which part (a) is a side view when the engaged portion is positioned in an upper portion of the engaging portion, and part (b) is a side view when the engaged portion is positioned at an extension portion as the mounting of the developer supply container is completed.

Figure 19:
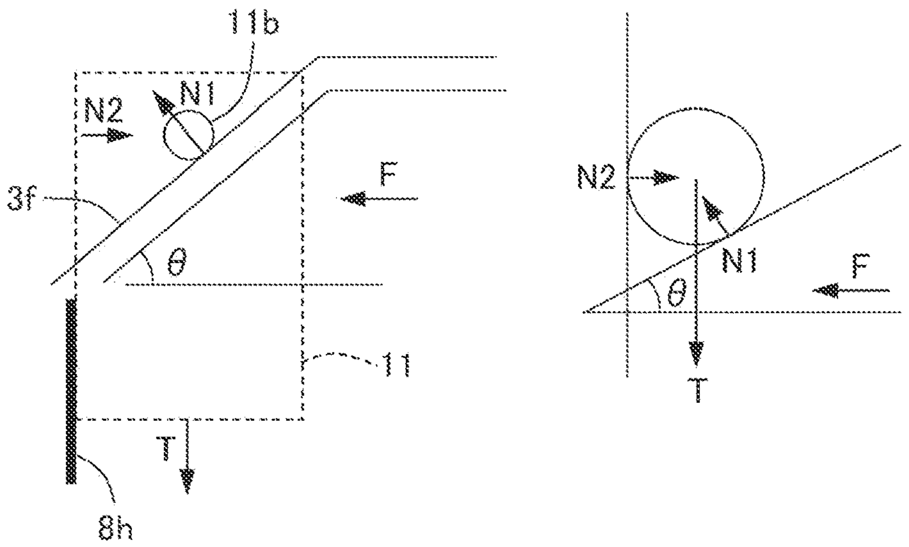
Figure 19:
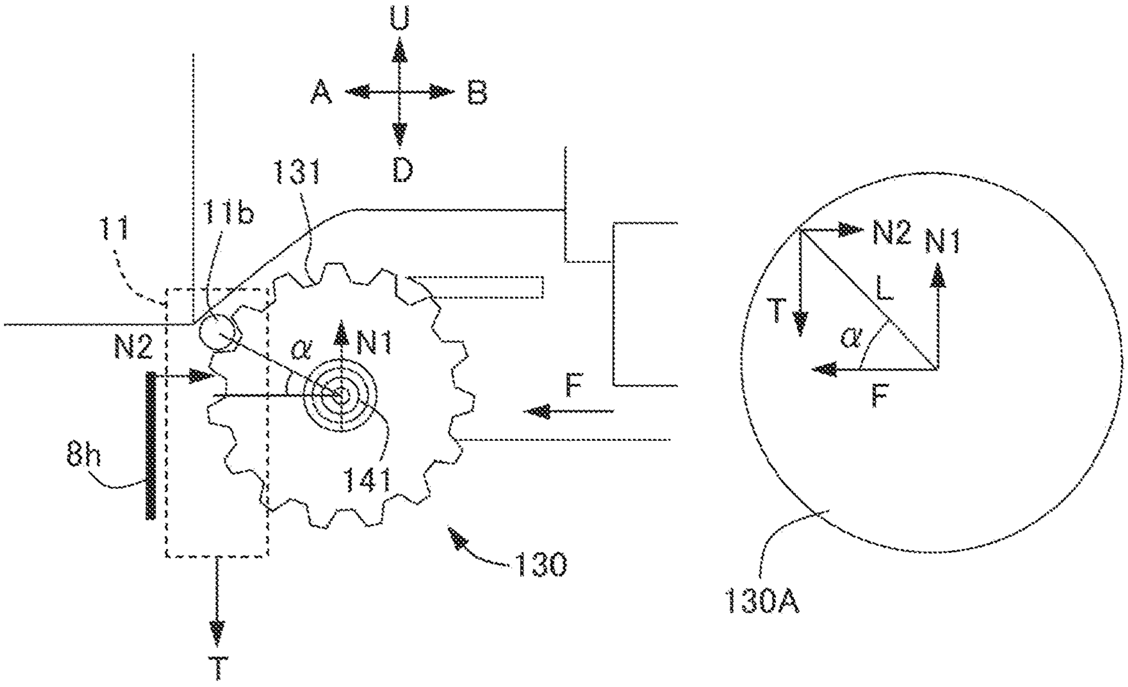

Parts (a) and (b) of FIG. 19 are schematic illustration of a force acting on the developer receiving portion during the mounting operation of the developer supply container, in which part (a) shows a comparative example, and part (b) shows Embodiment 2.

Figure 20:
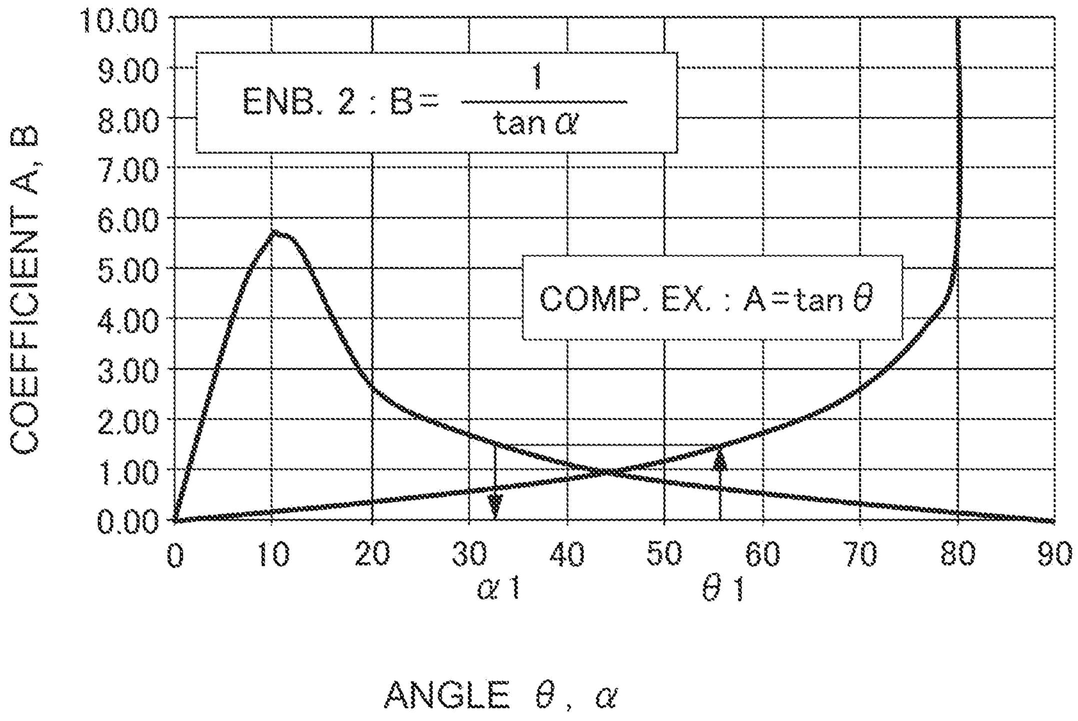

FIG. 20 is a graph showing the relationship between angles θ and α and the coefficients A and B.

DESCRIPTION OF THE EMBODIMENTS

Embodiment 1

In the following, Embodiment 1 of the present invention will be descried with reference to Figures to parts (b) of FIG. 15.

First, referring to FIG. 1 and FIG. 2, a schematic structure of an image forming apparatus of this embodiment will be described.

[Image Forming Apparatus]

Figure 1:
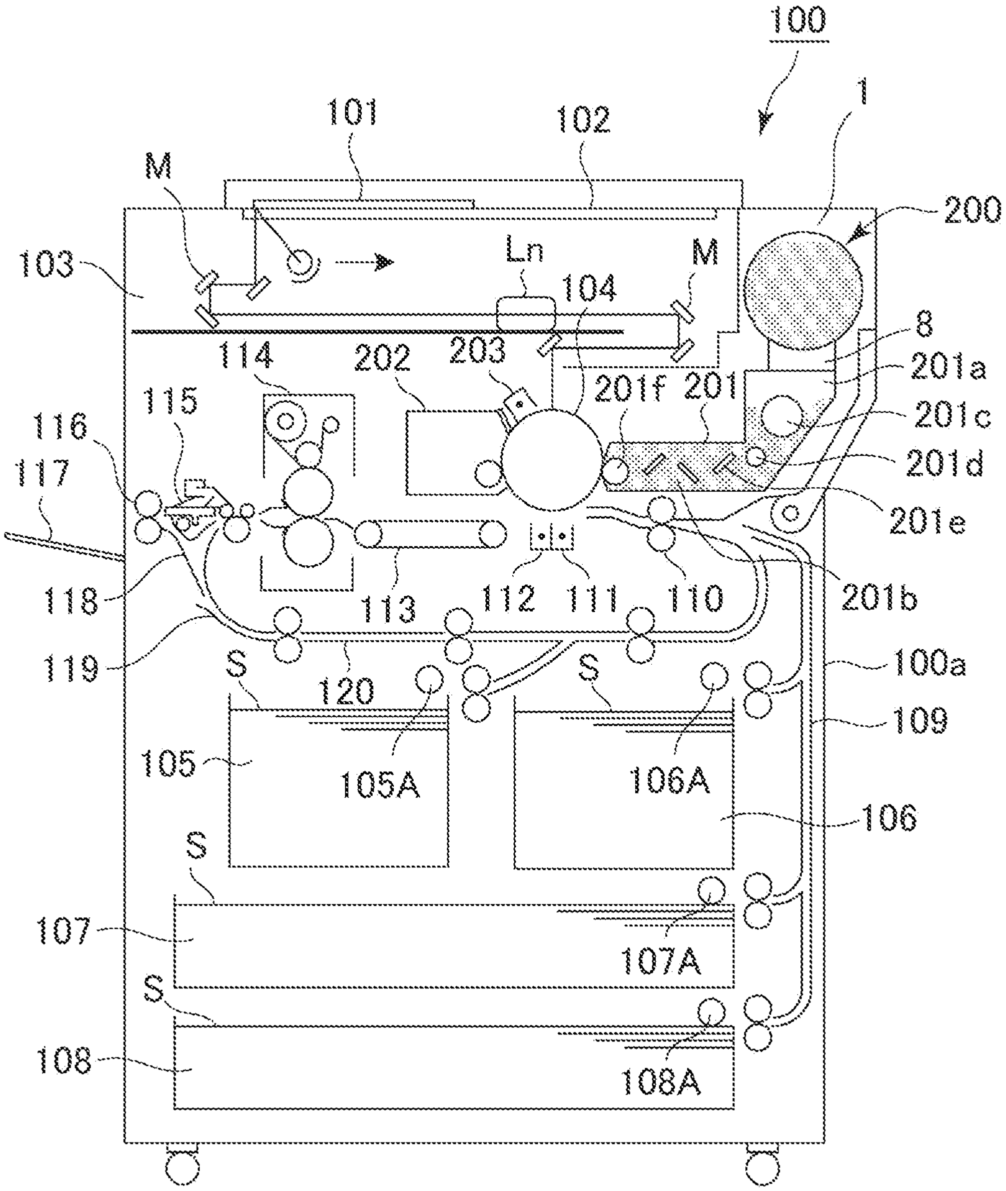
FIG. 1 shows a schematic structure diagram of an image forming apparatus according to Embodiment 1.

In FIG. 1, the image forming apparatus 100 includes an original reading device 103 at a top of a main assembly 100*a* of the image forming apparatus. An original 101 is placed on an original platen glass 102. A light image corresponding to image information of the original 101 is imaged, using a plurality of mirrors M and the lens Ln of the original reading device 103, on a photosensitive drum 104 which is a cylindrical photosensitive member as an image bearing member to form an electrostatic latent image. This electrostatic latent image is visualized using toner (one component magnetic toner) as a developer (dry powder) by a dry type developing device (one-component developing device) 201. Here, in this embodiment, a one-component magnetic toner is used as the developer to be supplied from the developer supply container 1 (also referred to as a toner cartridge), but the present invention is not limited to such an example, and it may be of a structure as will be described hereinafter.

More specifically, in the case of using a one-component developing device which performs developing operation with one component nonmagnetic toner, one component nonmagnetic toner is supplied as a developer. In addition, non-magnetic toner is supplied as the developer when using a two-component developer which develops the image using a two component developer prepared by mixing magnetic carrier and nonmagnetic toner. In this case, as the developer, a structure may be employed in which the magnetic carrier is also supplied together with the non-magnetic toner.

As described above, a developing device 201 shown in FIG. 1 develops the electrostatic latent image formed on the photosensitive drum 104 using the toner as the developer based on the image information of the original 101. In addition, a developer supplying system 200 is connected to developing machine 201, and the developer supplying system 200 includes a developer supply container 1 and a developer receiving apparatus 8 relative to which the developer supply container 1 is mountable and dismountable. Developer supplying system 200 will be described hereinafter.

The developing device 201 includes a developer hopper portion 201*a* and a developing roller 201*f*. In this developer hopper portion 201*a*, a stirring member 201*c* for stirring the developer supplied from the developer supply container 1 is provided. The developer stirred by the stirring member 201*c* is fed to a feeding member (201*e*) side by a feeding member 201*d*. And, the developer which has been sequentially fed by the feeding members 201*e* and 201*b* is carried on the developing roller 201*f* and finally supplied to a developing zone formed with the photosensitive drum 104. In this embodiment, a single component developer is used, and therefore, the toner as the developer is supplied from the developer supply container 1 to the developing device 201. However, in the case of using a two-component developer, it is possible to supply a mixture of the toner and the carrier as the developer from the developer supply container 1.

Cassettes 105 to 108 contain recording materials S such as sheets of paper. When an image is to be formed, a cassette containing an optimum recording material S among the sheets contained in these cassettes 105 to 108 is selected on the basis of the information inputted by the operator (user) on the operation portion 100*d* (FIG. 2) of the image forming apparatus 100 or on the basis of the size of the original 101. Here, as for the recording material S, it is not limited to sheets of paper, but it may be an OHP sheet or the like as the case may be. One sheet of recording material S fed by the feeding and separating devices 105A to 108A is fed to registration rollers 110 by way of a feeding portion 109. Then, the recording material S is fed in synchronization with the rotation of the photosensitive drum 104 and the scan timing of the original reading device 103.

A transfer charging device 111 and a separating charging device 112 are provided at positions opposing the photosensitive drum 104 on a downstream side of the registration roller 110 in the recording material feeding direction. The image of the developer (toner image) formed on the photosensitive drum 104 is transferred onto the recording material S fed by the registration roller 110, by a transfer charging device 111. And, the recording material S onto which the toner image is transferred is separated from the photosensitive drum 104 by a separation charging device 112. Subsequently, heat and pressure are applied to the recording material S fed by the feeding portion 113 in a fixing portion 114, so that the toner image is fixed on the recording material. Thereafter, the recording material S to which the toner image is fixed passes through a discharge/reversing portion 115 and is discharged to the discharge tray 117 by the discharge roller 116, in case of single-sided copy.

On the other hand, in case of double-sided copy, the recording material S passes through the discharge/reversing portion 115, and the recording material S is partly discharged to the outside of the apparatus once by the discharge roller 116. After this, at the timing when a trailing end of the recording material S passes through the switching member 118 and is still nipped by the discharge rollers 116, the position of the switching member 118 is switched, and the discharge roller 116 is rotated counterclockwise, by which the recording material S is fed again into the apparatus. Thereafter, the recording material S is fed to the registration roller 110 by way of the re-feeding and feeding portions 119 and 120, and is discharged to the discharge tray 117 by way of the same path as in the case of single-sided copying.

In the image forming apparatus 100 having the above-described structure, image forming process devices such as a developing device 201, a cleaner portion 202, a primary charging device 203 and the like are provided around the photosensitive drum 104. Here, the developing device 201 supplies the developer to the electrostatic latent image formed on the photosensitive drum 104 on the basis of the image information of the original 101 read by the original reading device 103 so as to develop the electrostatic latent image. In addition, the primary charging device 203 uniformly charges the surface of the photosensitive drum to form a desired electrostatic latent image on the photosensitive drum 104. Furthermore, the cleaner portion 202 has a function of removing the developer remaining on the photosensitive drum 104.

Figure 2:
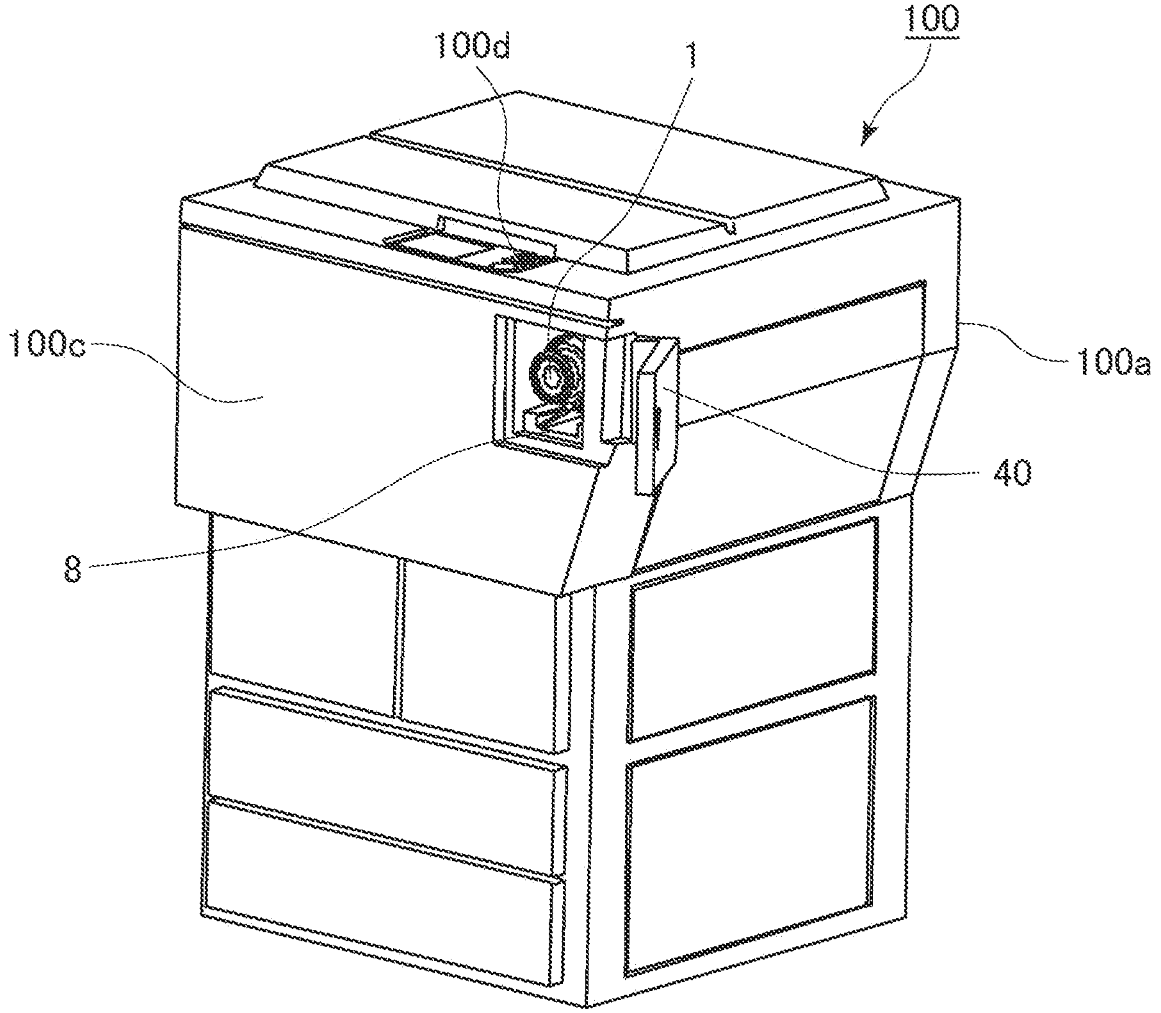
FIG. 2 is a perspective view of the image forming apparatus according to Embodiment 1.

As shown in FIG. 2, when the operator opens a replacement cover 40 which is a portion of an outer cover of the apparatus main assembly 100*a* of the image forming apparatus 100, a part of the developer receiving apparatus 8 which will be described hereinafter can be seen. And, by inserting the developer supply container 1 into this developer receiving apparatus 8, the developer supply container 1 is mounted in a state where it can supply the developer to the developer receiving apparatus 8. On the other hand, when the operator exchanges the developer supply container 1, it carries out the operation opposite to the loading operation, by which the developer supply container 1 is dismounted from the developer receiving apparatus 8, and thereafter a new developer supply container 1 can be mounted. Here, the replacement cover 40 is a cover exclusively for mounting/dismounting (exchanging) the developer supply container 1, and is opened and closed only for dismounting/mounting the developer supply container 1. On the other hand, the maintenance operation for the image forming apparatus 100 is performed by opening/closing a front cover 100*c*. Here, the replacement cover 40 and the front cover 100*c* may be integrated. In such a case, the replacement of the developer supply container 1 and the maintenance of the image forming apparatus 100 are performed by opening and closing the integrated cover (not shown).

[Developer Receiving Apparatus]

Next, referring to part (a) of FIG. 3 to part (c) of FIG. 4, the developer receiving apparatus 8 constituting the developer supplying system 200 will be described. As shown in part (a) of FIG. 3, the developer receiving apparatus 8 is provided with a mounting portion (mounting space) 8*f* to which the developer supply container 1 is dismountably mounted. The mounting portion 8*f* is provided with an insertion guide 8*e* for guiding the developer supply container 1 in the mounting and dismounting directions. In the case of this embodiment, the structure is such that the dismounting direction B of the developer supply container 1 is opposite to the direction A of mounting the developer supply container 1 by the insertion guide 8*e*.

As shown in part (a) of FIG. 3 to part (a) of FIG. 4, the developer receiving apparatus 8 has a drive gear 9 which functions as a driving mechanism for driving the developer supply container 1. A rotational driving force is transmitted to the actuating gear 9 from a driving motor 500 by way of a driving gear train (not shown), so that the actuating gear 9 applies the rotational driving force to the developer supply container 1 mounted in the mounting portion 8*f*. The operation of the drive motor 500 is controlled by the control device 600.

In addition to controlling the driving motor 500, the control device 600 controls overall of the image forming apparatus 100. The control device 600 has a CPU (Central Processing Unit), a ROM (Read Only Memory), and a RAM (Random Access Memory). The CPU controls each portion while reading the program corresponding to a control procedure stored in the ROM. In addition, working data and an input data are stored in the RAM, and the CPU executes control while looking up the data stored in the RAM on the basis of the program etc.

In the mounting portion 8*f* of the developer receiving apparatus 8, there is provided a developer receiving portion 11 for receiving the developer discharged out of the developer supply container 1. The developer receiving portion 11 is connected to a container discharge opening 3*a*4 of the developer supply container 1 when the developer supply container 1 is mounted, and has a receiving opening 11*a* for receiving the developer discharged through the container discharge opening 3*a*4. The developer receiving portion 11 is mounted so as to be movable (displaceable) in the direction in which the receiving opening 11*a* moves toward and away from the container discharge opening 3*a*4 (in this embodiment, the direction crossing with the direction A in which the developer supply container 1 is mounted (more specifically, vertical direction relative to the developer receiving apparatus 8)). The developer receiving portion 11 is mounted to the developer receiving apparatus 8 so as to be movable (displaceable) in the vertical direction along a wall surface 8*h* of the developer receiving apparatus 8 (part (a) of FIG. 8 through part (b) of FIG. 9)). As shown in part (b) of FIG. 3, in the case of this embodiment, the developer receiving portion 11 is urged by an urging member 12, including a helical compression coil spring, for example, in such a direction that the receiving opening 11*a* moves away from the container discharge opening 3*a*4 (vertically downward, reverse direction to a direction of displacement). Therefore, the developer receiving portion 11 moves against the urging force of the urging member 12 when the receiving opening 11*a* moves toward the container discharge opening 3*a*4 (upward in the vertical direction). Here, in the present specification, the direction in which the developer receiving portion 11 displaces in accordance with the mounting operation of the developer supply container 1 is an upward direction in the vertical direction. This direction is called upward (displacing direction, upward in the vertical direction) U, and the downward vertical direction in the opposite direction is called the downward direction D.

In addition, as shown in part (a) of FIG. 4, in the mounting portion 8*f* of the developer receiving apparatus 8, a first shutter stopper portion 8*a* and a second shutter stopper portion 8*b* are provided on the upstream side of the developer receiving portion 11 in the mounting direction A. In the developer supply container 1 which is moving relative to the developer receiving apparatus 8 during mounting/dismounting, the first and second shutter stopper portions 8*a* and 8*b* regulate the relative movement of the shutter 4 (part (b) of FIG. 5) which will be described hereinafter relative to the developer receiving apparatus 8. In this case, the shutter 4 moves relative to a part of the developer supply container 1 other than the shutter 4, such as the container main body 2 described hereinafter.

As shown in part (b) of FIG. 3 and part (b) of FIG. 4, below, in the downward direction D, of the developer receiving apparatus 8, there is provided a sub-hopper 8*c* for temporarily storing the developer supplied from the developer supply container 1. Inside the sub-hopper 8*c*, there are provided a feeding screw 14 for feeding the developer to the developer hopper portion 201*a* (FIG. 1) which is a portion of the developing device 201, and an opening 8*d* communicating with the developer hopper portion 201*a*.

As shown in part (c) of FIG. 4, the developer receiving portion 11 is provided with a main assembly seal 13 formed so as to surround the receiving opening 11*a*. The main assembly seal 13 is made of elastic material, foam or the like. In the state that the developer supply container 1 is mounted, the main assembly seal 13 is in close contact with an opening seal 3*a*5 surrounding the container discharge opening 3*a*4 of the developer supply container 1, with the shutter 4 described hereinafter sandwiched therebetween. By this, the developer discharged through the container discharge opening 3*a*4 of the developer supply container 1 to the receiving opening 11*a* by way of the shutter opening (discharge port) 4*j* of the shutter 4 does not leak out of the receiving opening 11*a* which is a part of the developer feeding passage. That is, the main assembly seal 13 is provided around the receiving opening 11*a*, and when the communication between the receiving opening 11*a* and the shutter opening 4*j* is established, the sealing is performed by elastic deformation between the receiving opening 11*a* and the shutter opening 4*j*.

Here, it is desirable that a diameter of the receiving opening 11*a* is substantially the same as or slightly larger than a diameter of the shutter opening 4*j* of the shutter 4, in order to prevent the interior of the mounting portion 8*f* from being contaminated by the developer. This is because if the diameter of the receiving opening 11*a* is smaller than the diameter of the shutter opening 4*j*, the developer discharged from the shutter opening 4*j* is more likely to be deposited on the upper surface of the main assembly seal 13. If the developer is deposited on the lower surface of the developer supply container 1 at the time of mounting/dismounting operation of the developer supply container 1, it becomes a cause of contamination by the developer. In view of this point, it is preferable that the diameter of the receiving opening 11*a* is roughly the same as or about 2 mm larger than the diameter of the shutter opening 4*j*. For example, in the case that the diameter of the shutter opening 4*j* of the shutter 4 is a fine hole (pinhole) of about 2 mm in diameter, it is preferable that the diameter of the receiving opening 11*a* is about 3 mm.

In addition, as shown in part (c) of FIG. 4, on the side surface of the developer receiving portion 11, an engaged portion (portion to be engaged) 11*b* projecting toward the center side is provided. In the case of this embodiment, the engaged portion 11*b* is directly engaged with the engaging portion 30 (part (a) in FIG. 7) provided in the developer supply container 1 which will be described hereinafter, and is guided by the engaging portion 30, by which the developer receiving portion 11 is lifted toward the developer supply container 1 in the upward direction U.

[Developer Supply Container]

Next, referring to part (a) FIG. 5 to part (b) of FIG. 15, the developer supply container 1 constituting the developer supplying system 200 will be described. First, referring to part (a) of FIG. 5 and part (b) of FIG. 5, the overall structure of the developer supply container 1 will be described. The developer supply container 1 mainly includes the container main body 2, a flange portion 3, the shutter 4, a pump portion 5, a reciprocating member 6, and a cover 7. The container body 2 supplies the developer to the developer receiving apparatus 8 by rotating in the developer receiving apparatus 8 in the direction indicated by an arrow R about the rotation axis P shown in part (a) of FIG. 5. In the following, each element constituting the developer supply container 1 will be described in detail.

[Container Body]

As shown in FIG. 6, the container main body 2 mainly comprises a developer accommodating portion 2*c* for containing the developer. In addition, the container main body 2 is provided with a helical feeding groove 2*a* (feeding portion) for feeding the developer in the developer accommodating portion 2*c* by rotating the container main body 2 in the direction of the arrow R around the rotation axis P. In addition, a cam groove 2*b* and a drive receiving portion (gear) 2*d* for receiving a driving force from the main assembly side are integrally formed over the entire periphery of the outer circumferential surface of the container main body 2 on one end side. Here, in this embodiment, the cam groove 2*b* and the drive receiving portion 2*d* are integrally formed with the container body 2, but the cam groove 2*b* or the drive receiving portion 2*d* may be formed as a separate member and may be integrally mounted to the container body 2. In addition, in this embodiment, for example, a toner including a volume average particle diameter of 5 μm to 6 μm is accommodated in the developer accommodating portion 2*c* as the developer. In addition, in this embodiment, the developer accommodating portion 2*c* includes not only the container main body 2 but also the interior spaces of the flange portion 3 and the pump portion 5 which will be described hereinafter.

[Flange Portion]

Referring to part (a) of FIG. 5, part (b) of FIG. 5, part (a) of FIG. 7 and part (b) of FIG. 7, the flange portion 3 will be described. The flange portion 3 is mounted so as to be rotatable relative to the container body 2 about the rotation axis P. And, when the developer supply container 1 is mounted to the developer receiving apparatus 8, the flange portion 3 is held so as not to rotate in the arrow R direction relative to the mounting portion 8*f*(part (a) of FIG. 3). In addition, as shown in part (b) of FIG. 7, a container discharge opening 3*a*4 is provided in a portion of the flange portion 3, and an opening seal 3*a*5 is mounted to the periphery thereof. As shown in part (b) of FIG. 5, the flange portion 3 is provided with the pump portion 5, the reciprocating member 6, the shutter 4, and the cover 7.

First, the pump portion 5 is threaded at one end side (mounting direction A) of the flange portion 3, and the container body 2 is connected to the other end side (side in the dismounting direction B) with a sealing member (not shown) therebetween. In addition, a reciprocating member 6 is provided so as to sandwich the pump portion 5, and the engaging projection 6*b* (parts (a) and (b) of FIG. 14) provided on the reciprocating member 6 is engaged with the cam groove 2*b* (FIG. 6). The flange portion 3 is provided with the shutter 4. In this embodiment, the flange portion 3 and the shutter 4 constitute a discharge portion 300 for discharging the developer accommodated in the developer accommodating portion 2*c* out. In addition, the surface on which the shutter 4 is provided is the bottom side of the flange portion 3, more particularly, the top surface of the bottom portion 3*d*. In order to improve an outer appearance and to protect the reciprocating member 6 and pump portion 5, the cover 7 is integrally assembled so as to cover the whole of the flange portion 3, the shutter 4, the pump portion 5, and the reciprocating member 6 as shown in parts (a) and (b) of FIG. 5.

In addition, as shown in parts (a) and (b) of FIG. 7, the flange portion 3 has a flat bottom portion 3*d* provided horizontally and an opening portion 3*e* formed in a substantially central portion of the bottom portion 3*d*, the opening portion 3*e* penetrating in a vertical direction. As shown in part (b) of FIG. 5, the bottom portion 3*d* slidably supports the shutter 4 at the lower portion. When the main assembly seal 13 and the receiving opening 11*a* of the developer receiving portion 11 are displaced in the upward direction U, they pass through the opening portion 3*e*.

As shown in part (a) of FIG. 7, on each of side walls of the flange portion 3 with respect to the widthwise direction of the flange portion 3 perpendicular to the direction of insertion and removal and the vertical direction, a rotation shaft 41 projecting outward in the width direction is provided. In addition, in the wall portions of the flange portion 3, the first positioning portion 42 is provided on the mounting direction A side of the rotation shaft 41, and the second positioning portion 43 is provided on the side of the rotation axis 41 in the dismounting direction B. On the rotary shaft 41, the engaging portion 30 is rotatably supported, and the engaging portion 30 is fixed by a snap fit (not shown) for preventing disengagement.

[Engaging Portion]

As shown in part (a) of FIG. 7, the flange portion 3 is provided with an engaging portion 30 engageable with the engaged portion 11*b* (part (a) of FIG. 3) of the developer receiving portion 11. The engaging portion 30 engages with the engaged portion 11*b* with the mounting operation of the developer supply container 1 and moves the developer receiving portion 11 in the upward direction U such that the receiving opening 11*a* communicates with the shutter opening 4*j*. At this time, a developer supply container 1 and the developer receiving portion 11 are connected with each other enable supplying of the developer from the developer supply container 1 to the developer receiving portion 11. In addition, in order to break the connection state between the developer supply container 1 and the developer receiving portion 11 with the takeout operation of the developer supply container 1, the engaging portion 30 performs a guiding operation such that the developer receiving portion 11 is displaced in the downward direction D away from the developer supply container 1. Here, as shown in parts (a) and (b) of FIG. 7, in this embodiment, the engaging portion 30 is provided on each side of the flange portion 3 with respect to the width direction perpendicular to the insertion/extracting direction Ad to the vertical direction.

As shown in part (a) of FIG. 7, part (a) of FIG. 8 to part (b) of FIG. 9, the engaging portion 30 is provided rotatably about the rotation shaft 41, and it is provided with the holding portion (recess portion) 31 having a recess shape. Part (c) of FIG. 5 is a front view of the developer supply container 1. As shown in part (c) of FIG. 5, the engaging portion 30 is disposed below a plane the H including the rotation axis P. Moreover, the plane H including the rotation axis P is a horizontal plane, and the engaging portion 30 is disposed below this horizontal plane. The engaging portion 30 has an arm shape which has a swing center of rotation by the rotary shaft 41 at its base end portion 30*a* and has only one holding portion 31 at its free end portion 30*b*. The base end portion 30*a* is provided with a through hole which is fitted with the rotation shaft 41 and is rotatably supported. The holding portion 31 has a semi-arcuate curved surface opened toward the opposite side to the rotation shaft 41, and is capable of holding the engaged portion 11*b*. The holding portion 31 is engaged with the engaged portion 11*b* to hold the engaged portion 11*b*. In this embodiment, the holding portion 31 can hold it in the rotational direction about the rotation shaft 41 and in the radial direction toward the rotation shaft 41.

The engaging portion 30 is rotatable between a first position shown in parts (a) and (b) of FIG. 8 and a second position shown in parts (a) and (b) of FIG. 9. As shown in parts (a) and (b) of FIG. 8, in the first position, the holding of the engaged portion 11*b* by the holding portion 31 is started in the mounting operation of the developer supply container 1 to the apparatus main assembly 100*a*. Here, in the first position, the position of the holding portion 31 is constituted to be above (upward direction U) the center of the rotation shaft 41. The second position is a position where the developer receiving portion 11 is displaced to a position where the receiving opening 11*a* communicates with the container discharge opening 3*a*4 as shown in parts (a) and (b) of FIG. 9. And, the engaging portion 30 is rotated in accordance with the mounting operation of the developer supply container 1 to the apparatus main assembly 100*a* to rotate the engaged portion 11*b* held by the holding portion 31 around the rotation shaft 41 upwardly (U)(part (a) of FIG. 8 to part (b) of FIG. 9).

In addition, as shown in part (b) of FIG. 9, the engaging portion 30 is provided with an extension portion (support portion) 32 for supporting the engaged portion 11*b* dismounted from the holding portion 31 in the upstream side, at an upstream side position in the mounting direction A of the holding portion 31. That is, the extension portion 32 supports the engaged portion 11*b* at a position where the developer is discharged from the developer supply container 1 to the developer receiving portion 11. In this embodiment, the extension portion 32 is formed of the same member as the engaging portion 30, and is formed so as to be parallel to the mounting direction A when the engaging portion 30 is positioned at the second position.

In Addition, as shown in parts (a) and (b) of FIG. 8, the first positioning portion 42 formed on the flange portion 3 positions the engaging portion 30 at the first position, by abutting on the side surface of the mounting direction (A) side surface of the engaging portion 30. As shown in parts (a) and (b) of FIG. 9, the second positioning portion 43 abuts to the side surface of the engaging portion 30 on the dismounting direction (B) side to position the engaging portion 30 in the second Position. The engaging portion 30 is urged by the torsion coil spring 44, for examples as to contact the first positioning portion 42. Therefore, when the developer supply container 1 is inserted into the image forming apparatus 100, the engaging portion 30 abuts against the first positioning portion 42. By this, the engaging portion 30 is held in the first position, even if it receives vibrations or impact during transportation of the developer supply container 1. Here, the engaging portion 30 is positioned in the width direction by snap fit to the rotation shaft 41 so as not to disengage from the rotation shaft 41.

[Shutter]

Next, referring to parts (a) and (b) of FIG. 12 the shutter 4 will be described. The shutter 4 slidable on the upper surface of the bottom portion 3*d* (part (a) of FIG. 7) of the flange portion 3 move relative to a portion (flange portion 3) of the developer supply container 1. The shutter 4 has a shutter opening 4*j* as a discharge opening, and opens and closes the container discharge opening 3*a*4 (part (b) in FIG. 7) of the developer supply container 1 in accordance with the mounting and dismounting operation of the developer supply container 1. That is, by moving the shutter 4 relative to the developer supply container 1 in accordance with the mounting operation of the developer supply container 1, the receiving opening 11*a* of the developer receiving portion 11 and the shutter opening 4*j* communicate with each other, and in addition with the container discharge opening 3*a*4. By this, the developer in the developer supply container 1 can be discharged to the receiving opening 11*a*. That is, the discharge portion 300 (part (b) of FIG. 5) for discharging the developer is constituted by the flange portion 3 and the shutter 4, and the shutter 4 of the discharge portion 300 is provided with the shutter opening 4*j* as the discharge opening for discharging the developer.

In addition, the shutter 4 is provided with a connecting surface 4*k* connected to the developer receiving portion 11 so as to surround the shutter opening 4*j*, on the sliding surface 4*i* opposite to the bottom portion 3*d*. The connecting surface 4*k* has a larger diameter than the shutter opening 4*j* and is parallel to the sliding surface 4*i*. After mounting the developer supply container 1, the upper end surface of the main assembly seal 13 is brought into close contact with the connecting surface 4*k*.

On the other hand, as shown in parts (a) and (b) of FIG. 12, a developer sealing portion 4*a* is provided at a position deviated from the shutter opening 4*j* of the shutter 4. The developer sealing portion 4*a* closes the container discharge opening 3*a*4, and as the shutter 4 moves relative to the developer supply container 1 in accordance with the operation of taking out the developer supply container 1. In addition, the developer sealing portion 4*a* prevents leakage of the developer from the container discharge opening 3*a*4, when the developer supply container 1 is not mounted to the mounting portion 8*f* (part (a) of FIG. 3) of the developer receiving apparatus 8. A sliding surface 4*i* sliding on the upper surface of the bottom portion 3*d* of the flange portion 3 is provided on a back surface side (the developer receiving portion 11 side) of the developer sealing portion 4*a*. Here, the shutter 4 is engaged with the flange portion 3 in an attitude in which the developer sealing portion 4*a* faces upward.

The shutter 4 is provided with a first stopper portion 4*b* and a second stopper portion 4*c* held by first and second shutter stopper portions 8*a* and 8*b* (part (a) of FIG. 4) of the developer receiving apparatus 8 doing so that the developer supply container 1 is capable of moving relative to the shutter 4. In addition, the shutter 4 is provided with a support portion 4*d* for displaceably supporting the first and second stopper portions 4*b* and 4*c*. The support portion 4*d* is elastically deformable and extends from one side to other side of the developer sealing portion 4*a*. And, the first stopper portion 4*b* and the second stopper portion 4*c* are provided at the free end portion of the support portion 4*d*. By this, the first and second stopper portions 4*b*, 4*c* can be displaced by the elasticity of the support portion 4*d*.

Here, the first stopper portion 4*b* is inclined so that an angle $\alpha$ formed by the first stopper portion 4*b* and the support portion 4*d* is an acute angle. On the contrary, the second stopper portion 4*c* is inclined so that an angle $\beta$ formed by the second stopper portion 4*c* and the support portion 4*d* is an obtuse angle.

When the developer supply container 1 is mounted, the first stopper portion 4*b* is engaged with the guide portion 8*g* of the developer receiving apparatus 8 and is displaced to pass through the second shutter stopper portion 8*b*, thus engaging with the first shutter stopper portion 8*a*. As the first stopper portion 4*b* and the first shutter stopper portion 8*a* are engaged with each other, the position of the shutter 4 with respect to the developer receiving apparatus 8 is fixed. The second stopper portion 4*c* is engaged with the second shutter stopper portion 8*b* of the developer receiving apparatus 8 to release the first stopper portion 4*b* from the first shutter stopper portion 8*a* at the time of removing the developer supply container 1. By this, the shutter 4 is dismounted from the developer receiving apparatus 8.

[Pump Portion]

Referring to parts (a) and (b) of FIG. 13, the pump portion 5 will be described. The pump portion 5 alternately and repeatedly changes the internal pressure of the developer accommodating portion 2*c*, switching between a state lower than the atmospheric pressure and a state higher than atmospheric pressure by the driving force received by the drive receiving portion 2*d* of the container body 2 (FIG. 6). In this embodiment, in order to stably discharge the developer through the small container discharge opening 3*a*4 as described above, the pump portion 5 is provided at a portion of the developer supply container 1. The pump portion 5 is a displacement type pump in which a volume is changed. More specifically, the pump portion 5 employed in this embodiment has a bellows-like stretchable member capable of expanding and contracting.

The pressure inside the developer supply container 1 is changed by the expansion and contracting operations of the pump portion 5, and the developer is discharged by utilizing the pressure. More specifically, when the pump portion 5 is contracted, the interior of the developer supply container 1 is brought into a compressed state, and the developer is pushed out to discharge through the container discharge opening 3*a*4 of the developer supply container 1. In addition, when the pump portion 5 is expanded, the interior of the developer supply container 1 is brought into a reduced pressure state, and the air is taken in from the outside through the container discharge opening 3*a*4. By air taken in, the developer in the container discharge opening 3*a*4 and in the neighborhood of the reservoir 3*a*3 (part (a) in FIG. 7) that stores the developer transported from the container body 2 of the flange portion 3 is loosened and smoothly discharged.

That is, in the neighborhood of the container discharge opening 3*a*4 of the developer supply container 1 and the neighborhood of the storage portion 3*a*3, the developer in the developer supply container 1 may gather due to vibrations imparted when transporting the developer supply container 1 and so on, with the possible result that the developer is caked in this portion. Therefore, as described above, the air is taken in through the container discharge opening 3*a*4, so that it is possible to loosen the developer that has been caked. In addition, in the usual discharging operation of the developer, as air is taken in as described above, the air and the powder as the developer are mixed with the result that the flowability of the developer is enhanced, and therefore, clogging of the developer does not easily occur, as an additional advantage. By repeatedly performing the expansion and contracting operation as described above, the developer is discharged.

As shown in part (a) of FIG. 13, in the pump portion 5, a junction portion 5*b* is provided so as to be able to be joined with the flange portion 3 on the opening end side (dismounting direction B). In this embodiment, screw threads are formed as the joint portion 5*b*. In addition, as shown in part (b) of FIG. 13, the pump portion 5 has a reciprocating member engaging portion 5*c* which engages with the reciprocating member 6, which will be described hereinafter, on the other end side (the mounting direction A side) opposite to the opening end.

In addition, the pump portion 5 has a bellows-shaped expandable portion (bellows portion, expansion and contraction member) 5*a* in which crests and bottoms are alternately formed periodically. The expansion and contraction portion 5*a* is capable of contracting by moving the reciprocating member engaging portion 5*c* in the dismounting direction B with respect to the joining portion 5*b* along the folding lines (with folding lines as the base point), and is capable of expanding by moving reciprocating member engaging portion 5*c* in the mounting direction A. Therefore, when the bellows-like pump portion 5 as employed in this embodiment, it is possible to reduce variations in volumetric change with respect to the expansion and contraction amount, and therefore, it is possible to accomplish the stable volumetric change.

Here, in this embodiment, polypropylene resin is used as the material of the pump portion 5, but the present invention is not limited to this example. As for the material (material) of the pump portion 5, any material may be used as long as it has an expansion and contraction function and is capable of changing the internal pressure of the developer accommodating portion by changing the volume. For example, ABS(acrylonitrile-butadiene-styrene copolymer), polystyrene, polyester, polyethylene, and so on are usable.

Or, rubber, other stretchable materials or the like can also be used.

[Reciprocating Member]

Referring to parts (a) and (b) of FIG. 14, the reciprocating member 6 will be described. In order to change the volume of the pump portion 5, the reciprocating member 6 is provided with a pump engaging portion 6*a* (part (b) of FIG. 13) which engages with the reciprocating member engaging portion 5*c* provided on the pump portion (part (b) of FIG. 13). In addition, the reciprocating member 6 is provided with an engaging projection 6*b* to be engaged with the above-described cam groove 2*b* (FIG. 6) at the time of assembly. The engaging projection 6*b* is provided at the free end portion of the arm 6*c* extending in the mounting and dismounting direction from the neighborhood of the pump engaging portion 6*a*. In addition, the reciprocating member 6 is regulated in rotation around the rotation axis P (part (a) of FIG. 5) of the arm 6*c* by the reciprocating member holding portion 7*b*(part (b) of FIG. 15) of the cover 7 which will be described hereinafter. Therefore, when the container main body 2 is driven by the drive receiving portion 2*d* by the driving gear 9, and the cam groove 2*b* rotates integrally, the reciprocating member 6 reciprocates back and forth in the directions An and B by the urging action of the engaging projection 6*b* fitted in the cam groove 2*b* and the reciprocating member holding portion 7*b* of the cover 7. Accordingly, the pump portion 5 engaged with the pump engaging portion 6*a* of the reciprocating member 6 by way of the reciprocating member engaging portion 5*c* expands and contracts in the dismounting direction B and the mounting direction A.

[Cover]

Referring to parts (a) and (b) of FIG. 15, the cover 7 will be described. As described above, the cover 7 is provided as shown in part (b) of FIG. 5 for the purpose of improving the appearance of the developer supply container 1 and protecting the reciprocating member 6 and the pump portion 5. In more detail, the cover 7 is provided so as to cover the entirety of the flange portion 3, the pump portion 5, and the reciprocating member 6. As shown in part (a) of FIG. 15, the cover 7 is provided with a guide groove 7*a* to be guided by the insertion guide 8*e* (part (a) of FIG. 3) of the developer receiving apparatus 8. In addition, as shown in part (b) of FIG. 15, the cover 7 is provided with a reciprocating member holding portion 7*b* for restricting rotation of the reciprocating member 6 about the rotation axis P (part (a) of FIG. 5).

[Mounting Operation of Developer Supplying Container]

Referring to parts (a) of FIG. 8 to (b) of FIG. 9, the operation of mounting the developer supply container 1 to the developer receiving apparatus 8 will be described. Here, part (a) of FIG. 8 illustrates a state before the engaged portion 11*b* is held by the holding portion 31 when the developer supply container 1 is inserted, and part (b) of FIG. 8 illustrates a state when the engaged portion 11*b* is held by the holding portion 31 as the developer supply container 1 is inserted, wherein in these states, the engaging portions 30 are located at the first position. In addition, part (a) of FIG. 9 shows a state when the engaging portion 30 has moved to the second position with the insertion of the developer supply container 1, and part (b) of FIG. 9 shows a state when the engaged portion 11*b* is positioned at the extension portion 32 as the container 1 is completely mounted.

The developer supply container 1 is inserted into image forming apparatus 100, and as shown in part (a) of FIG. 8, the developer supply container 1 is moved in the mounting direction A. At this time, the holding portion 31 and the engaged portion 11*b* have not yet been engaged. Until this point, the position of the flange portion 3 and the shutter 4 has not yet been displaced relative to each other, and the container discharge opening 3*a*4 is sealed by the developer sealing portion 4*a* of the shutter 4. At this time, as shown in part (a) of FIG. 12, in the shutter 4, the stopper portions 4*b*, 4*c* are engaged with the shutter stopper portions 8*a*, 8*b* of the developer receiving apparatus 8, and the position of the shutter 4 in the mounting direction A with respect to the developer receiving apparatus 8 is fixed. Therefore, even if the developer supply container 1 is moved in the mounting direction A after this, the shutter 4 does not move relative to the developer receiving portion in the insertion/removal direction although shutter 4 moves relative to the developer supply container 1 except for the shutter 4 itself in the mounting direction A.

When the developer supply container 1 is further moved in the mounting direction A, the engaged portion 11*b* is abutted by and is held by the holding portion 31, as shown in part (b) of FIG. 8. Here, structure is such that when the engaging portion 30 is in the first position, the position of the holding portion 31 is positioned above (in the upper direction U) the center of the rotation shaft 41. In addition, the engaged portion 11*b* is provided at the same position as the position (height) of the holding portion 31 of the engaging portion 30 located at the first position. By this, the engaged portion 11*b* is held by the holding portion 31 along with the mounting operation of the developer supply container 1, and is moved in the upward direction U. Here, assuming that the positions of the holding portion 31 and the engaged portion 11*b* are located below (in the downward direction D) the center of the rotation shaft 41, the engaging portion 30 receives a force in a direction opposite to the direction of rotation as described hereinafter, and operation is not proper. In addition, at this point of time, the positions of the shutter 4 and the flange portion 3 are displaced relative to each other, but the position of the receiving opening 11*a* remains at the initial position and is not in contact with the shutter 4.

When the developer supply container 1 is further moved in the mounting direction A, the engaging portion 30 is pushed by the engaged portion 11*b* at the holding portion 31. By this, a rotational moment is produced in a RI direction shown in part (b) of FIG. 8, and the engaging portion 30 is rotated. By this, the developer receiving portion 11 is displaced in the upward direction U along the wall surface 8*h* of the developer receiving apparatus 8. Thereafter, as shown in part (a) of FIG. 9, the engaging portion 30 abuts against the second positioning portion 43, so that the rotation stops. The engaging portion 30 finishes the movement to the second position. The developer receiving portion 11 is lifted in the upward direction U from the initial position, and the receiving opening 11*a* is brought into contact with the shutter opening 4*j* of the shutter 4. In this state, the shutter opening 4*j* and the container discharge opening 3*a*4 are not communicated with each other, and therefore, the developer accommodated in the developer supply container 1 is not discharged into the developer receiving apparatus 8.

When the developer supply container 1 is further moved in the mounting direction A, and the developer supply container 1 is pushed to the clamp mounting complete position, the engaged portion 11*b* is moved, with rotation of the engaging portion 30 at rest, from the holding portion 31 to ride on the extension portion 32, as shown in part (b) of FIG. 9. By this, the position of the developer receiving portion 11 in the vertical direction is maintained. Since the developer receiving portion 11 is urged in the downward direction D by the urging member 12, the holding portion 31 does not separate from the engaged portion 11*b* during rotational movement. In addition, while the receiving opening 11*a* and the shutter opening 4*j* are in contact with each other, they relatively move with respect to the flange portion 3, and the fluid communication with the container discharge opening 3*a*4 is established. In this state, since the container discharge opening 3*a*4 communicates with the shutter opening 4*j* and the receiving opening 11*a*, it is possible to supply the developer from the developer supply container 1 into the developer receiving apparatus 8. In this process, the container discharge opening 3*a*4 and the shutter opening 4*j* communicate with each other, so that the container discharge opening 3*a*4, the shutter opening 4*j*, and the developer receiving opening 11*a* communicate with each other. Here, the extension portion 32 is parallel to the mounting direction A of the developer supply container 1. For this reason, the developer receiving portion 11 including the engaged portion 11*b* is not lifted beyond the state of contact with the shutter 4, and therefore, no excessive force acts on the engaged portion 11*b* and so on. Here, as shown in part (b) of FIG. 9, the positional relationship between the container discharge opening 3*a*4 and the extension portion 32 is such that a plane L passing through the container discharge opening 3*a*4 and perpendicular to the rotation axis P passes through the extension portion 32. In addition, a plane containing the extension portion 32 is positioned between the axis of rotation P and the container discharge opening 3*a*4.

On the other hand, when removing the developer supply container 1 from the apparatus main assembly 100*a*, the developer supply container 1 is displaced in the dismounting direction B from the state shown in part (b) of FIG. 9. The engaged portion 11*b* on the extension portion 32 relatively moves to engage with the holding portion 31, and the state shown in part (a) of FIG. 9 is established. Thereafter, while the engaging portion 30 rotates, the developer receiving portion 11 moves in the downward direction D, the engaging portion 30 abuts against the first positioning portion 42, and the rotation stops, and then the state shown in part (b) of FIG. 8 is established. At this time, the developer receiving portion 11 is urged in the downward direction D by the urging member 12, and therefore, the holding portion 31 and the engaged portion 11*b* are not separated from each other as in the case of mounting, and the engaging portion 30 is rotationally moved to the state shown in part (a) of FIG. 8. In addition, when removing the developer supply container 1, the developer receiving portion 11 is urged in the downward direction D by the urging member 12, and therefore, the developer supply container 1 is urged in the dismounting direction B through the engaging portion 30, and therefore the operating force of the urging force can be reduced. By this, the user takes out the used developer supply container 1 in the dismounting direction B and inserts the new developer supply container 1 in the mounting direction A, and then the engaging portion 30 is automatically displaced so that the developer supply container 1 can be exchanged, and therefore, the exchanging operation is easy.

Next, referring to part (a) of FIG. 8 to Part (c) of FIG. 11, the effect of the structure using the engaging portion 30 will be described in detail. Part (a) of FIG. 10 is an illustration of a force relationship of the developer receiving portion 11 in the structure of a comparison example. The developer receiving portion 11 moves along the wall surface 8*h* with the engaged portion 11*b* contacting the inclined portion 3*f* inclined at a predetermined angle θ. The force (operating force) for inserting the developer supply container 1 (flange portion 3) is F; the perpendicular force received by the engaged portion 11*b* from the inclined portion 3*f* is N1; the normal force received from the wall surface 8*h* is N2; and the force (drag) required to lift the receiving portion 11 in the upward direction U is T. At this time, the power relationship is as shown on the left of part (a) of FIG. 10. When these forces are applied to the engaged portion 11*b*, the force relationship is as shown on the right side of part (a) of FIG. 10. In addition, the engaged portion 11*b* is assumed to have a circular shape having a radius of r. Then, the following equilibrium equations hold.

$$F=N1\cdot\sin\theta$$

$$T=N1\cdot\cos\theta$$

$$F=N2$$

From the above three equations, the following expression holds.

$$F=\tan\theta\cdot T=A\cdot T$$

In addition, part (b) of FIG. 10 is an illustration of the force relationship of the developer receiving portion 11 in Embodiment 1. The developer receiving portion 11 is held by the holding portion 31 on the engaged portion 11*b*, and by the rotation of the engaging portion 30, the developer receiving portion 11 moves along the wall surface 8*h*. At this time, the force (operating force) for inserting the developer supply container 1 (flange portion 3) is F; the normal force received by the engaging portion 30 from the rotation shaft 41 is N1; and the normal force received by the developer receiving portion 11 from the wall surface 8*h* is N2. In addition, the force (drag) required to lift up the developer receiving portion 11 in the upward direction U is T, and an angle formed between the horizontal line and the straight line connecting the rotation shaft 41 of the engaging portion 30 and the engaged portion 11*b* is θ, then, the force relationship is as shown on the left of part (b) of FIG. 10. When these forces are applied to the engaged portion 11*b*, the force relationship is as shown on the right of part (b) of FIG. 10. In addition, the distance between the centers of the rotation shaft 41 and the engaged portion 11*b* is L. Then, the following equilibrium equations hold.

$$F=N2$$

$$N1=T$$

$$L\times(F\cdot\sin\theta-N1\cdot\cos\theta)=0$$

From the above three equations, the following equation holds.

$$F=T/\tan\theta=A\cdot T$$

Based on the above relationship, the relationship between θ and A was determined for a comparative example and Embodiment 1. The relationship between the movement distance in the horizontal direction of the developer supply container 1 and the operation force F when lifting the developer receiving portion 11 in the upward direction U is obtained for the comparative example and Embodiment 1.

Part (a) of FIG. 11 shows the relationship between the inclination angle θ of the inclined portion 3*f* and a coefficient An in the structure of the comparative example, and part (b) of FIG. 11 shows the relationship between the moving distance in the horizontal direction Ad the operating force F when the engaged portion 11*b* contacts the inclined portion 3*f* and then moves on the inclined portion 3*f*. As shown in part (a) of FIG. 11, in the comparative example, the smaller the inclination angle θ is, the smaller the value of the coefficient A becomes. However, if the inclination angle θ is decreased, the moving distance of the developer receiving portion 11 in the upward direction U with respect to the insertion distance of the developer supply container 1 is reduced, and therefore, from the standpoint of designing, it is necessary to set a certain inclination angles in consideration of the available space and the like. If the inclination angle of the comparative example is set to 45 degrees, the coefficient A=1. Assuming that T=1 N (constant value) is applied, and plotting the operating force F with respect to the insertion distance, the operating force F is constant at 1 N when the engaged portion 11*b* moves on the inclined portion 3*f*, as shown in part (b) of FIG. 11.

Next, part (c) of FIG. 11 shows the relationship between the rotation angle θ of the engaging portion 30 and the coefficient An in the structure of Embodiment 1, and part (b) of FIG. 11 shows the relationship between the moving distance in the horizontal direction Ad the operating force F when the developer receiving portion 11 is lifted after the engaged portion 11*b* contacts the holding portion 31. As shown in part (c) of FIG. 11, the coefficient A decreases as the rotation angle θ of the engaging portion 30 increases. In addition, with the structure of Embodiment 1, the rotation angle θ of the engaging portion 30 increases in accordance with the moving distance of the developer supply container 1 in the horizontal direction Ad therefore, as shown in part (b) of FIG. 11, the operating force F decreases with respect to the moving distance in the horizontal direction when the developer receiving portion 11 is lifted.

From the foregoing, in the comparative example, when the angle set at a predetermined inclination angle, the operating force F is constant regardless of the moving distance in the horizontal direction when the developer receiving portion 11 is lifted. In contrast, with the structure of Embodiment 1, the operating force decreases with respect to the horizontal movement distance of the developer receiving portion 11. The angle θ at the first position (part (a) in FIG. 8) is set at the angle at which the coefficient A becomes smaller than the coefficient A set in the structure of the comparative example, using the relationship shown in part (c) of FIG. 11, so that the operating force F with respect to the moving distance in the horizontal direction can be reduced as compared with the structure of the comparative example.

For example, part (b) of FIG. 11 shows the change of the operating force F in the case of the angle θ=50° at the first position, with respect to the result 1 N of the comparative example. As will be understood from this result, according to the structure of Embodiment 1, the operating force F with respect to the lifting of the developer receiving portion 11 can be lowered as compared to the fixed type guide as in the comparative example.

As described above, according to the developer supply container 1 of this embodiment, it is possible to reduce the operation force when mounting and dismounting the developer supply container 1 to and from the image forming apparatus 100, thus making the operation smoother and easier, and therefore, the operativity is improved.

Here, in the above-described embodiment, the shutter opening 4*j* is formed as a small discharge opening of a diameter of 2 mm in order to minimize contamination at the time of insertion and removal of the developer supply container 1. In addition, a pump portion 5 is provided to reliably discharge the developer through the small shutter opening 4*j* and to discharge the developer by the pressure produced by changing the volume of the developer accommodating portion 2*c*.

However, the present invention is not limited to this example, and the shutter opening 4*j* may be larger and the pump portion 5 may not be provided. In the present invention, the engaging portion 30 has a characteristic feature, and the provision of the engaging portion 30 improves operability at the time of insertion and removal described above.

In addition, in the embodiment described above, as shown in parts (a) and (b) of FIG. 9, when the engaging portion 30 is positioned at the second position, the extension portion 32 is parallel to the mounting direction A, but, the present invention is not limited to this example. For example, the extension portion 32 may be provided so as to be inclined with respect to the mounting direction A. In this case, a drawing device is provided in the developer receiving apparatus 8. The developer supply container 1 is fixed at a predetermined mounting position in a state of being drawn in the mounting direction by the drawing device, and therefore, the developer supply container 1 does not move in the dismounting direction unless an operator or the like intends to remove the developer by applying force. Therefore, even if the extended portion 32 is not parallel, the engaged portion 11*b* does not unintentionally move in the dismounting direction B.

In addition, in the above-described embodiment, the shutter opening 4*j* of the shutter 4 is the discharge opening with which the receiving opening 11*a* of the developer receiving portion 11 communicates, but the invention is not limited to this example. For example, the receiving opening of the developer receiving portion may be brought into direct contact with the container discharge opening of the developer supply container 1 to communicate therewith, without providing a shutter. In such a case, the container discharge opening corresponds to the discharge opening communicating with the receiving port.

Embodiment 2

Next, referring to parts (a) to 20 in FIG. 16, Embodiment 2 of the present invention will be described in detail. This embodiment is different from Embodiment 1 in that an engaging portion 130 has a plurality of holding portions 131 and the engaging portion 130 and an extension portion 142 are separate members. The other structure is the same as in Embodiment 1, and therefore, the same reference numerals will be used and the detailed description will be omitted.

[Flange Portion]

Referring to parts (a) and (b) of FIG. 16, the flange portion 3 of this embodiment will be described. As shown in part (a) of FIG. 16, on both wall portions of the flange portion 3 with respect to the width direction perpendicular to the inserting direction of the flange portion 3 and the vertical direction, a rotation shaft 141 is provided. In addition, on both wall portions of the flange portion 3, the extension portion 142 is provided on the downstream side of the rotation shaft 141 in the dismounting direction B. The engaging portion 130 is rotatably journaled on the rotation shaft 141, and the engaging portion 130 is fixed by a snap fit (not shown) for preventing the engagement portion 130 from disengaging. Here, the other constitution of the flange portion 3 is the same as in Embodiment 1, and therefore, the same reference numerals will be assigned to the corresponding elements, and the detailed description therefor will be omitted.

[Engaging Portion]

As shown in part (a) of FIG. 16, the flange portion 3 is provided with the engaging portion 130 engageable with the engaged portion 11*b* (part (a) of FIG. 3) of the developer receiving portion 11. The engaging portion 130 engages with the engaged portion 11*b* in accordance with the mounting operation of the developer supply container 1 to displace the developer receiving portion 11 in the upward direction U so that the receiving opening 11*a* communicates with the shutter opening 4*j*. At this time, the developer supply container 1 and the developer receiving portion 11 are connected to each other to enable supply of developer from the developer supply container 1 to the developer receiving portion 11. In addition, along with the takeout operation of the developer supply container 1, the engaging portion 130 guides the developer receiving portion 11 so as to be displaced in the downward direction D apart from the developer supply container 1, by which the connection state between the developer supply container 1 and the developer receiving portion 11 is broken. Here, as shown in parts (a) and (b) of FIG. 16, in this embodiment, the engaging portion 130 is provided on both sides in the width direction perpendicular to the insertion/extracting direction Ad to the vertical direction of the flange portion 3.

As shown in part (a) of FIG. 16, and part (a) of FIG. 17 to part (b) of FIG. 18, the engaging portion 130 is provided so as to be rotatable about the rotation shaft 141, and is provided with the holding portions 131. The engaging portion 130 is provided with a plurality of holding portions 131 arranged on an imaginary circle centered on the rotation shaft 141 (indicated in part (a) in FIG. 17, by a chain line). These holding portions 131 are arranged over the entire circumference of the engaging portion 130, and the engaging portion 130 has a gear shape provided with the holding portion 131 at a tooth bottom between the adjacent teeth 132. In this embodiment, the holding portions 131 are arranged at equally spaced intervals. A through hole is provided at a center portion of the engaging portion 130 and is fitted to the rotation shaft 141 so as to be rotatably journaled. The holding portion 131 is engaged with the engaged portion 11*b* to hold the engaged portion 11*b*. In this embodiment, the holding portion 131 is formed in a recess shape and can hold the engaged portion 11*b* in a rotational direction about the rotation shaft 141 and in a radial direction toward the rotation shaft 141. The engaging portion 130 rotates about the axis of the rotation shaft 141 to move the engaged portion 11*b* held by the holding portion 131 in the upward direction U as the developer supply container 1 is mounted to the apparatus main assembly 100*a* (part (a) of FIG. 17 to part (b) of FIG. 18). Here, the length in a circumferential direction between tooth crest surfaces of the adjacent teeth 132 is sufficiently shorter than the diameter of the engaged portion 11*b*. For this reason, as will be described hereinafter, even if the engaged portion 11*b* is contacted by the tooth crest of the tooth 132 with the result that it is not engaged with the holding portion 131 as the developer supply container 1 is mounted, it is just momentary, and the engaging portion 11*b* immediately held by the holding portion 131 by easy rotation of the engaging portion 130.

In addition, as shown in part (a) of FIG. 17, the extension portion 142 is provided on the upstream side in the mounting direction A of the holding portion 131 and is provided so as to be engageable with the engaged portion 11*b* detached from the holding portion 31 to the upstream side. In this embodiment, the extension portion 142 is formed as a separate member from the engagement portion 130, and is movable relative to the engagement portion 130, and extends in parallel with the mounting direction A. In this embodiment, the extension portion 142 is substantially parallel to the mounting direction A, but the present invention is not limited to this example, and the extension portion 142 may be inclined.

[Mounting Operation of Developer Supply Container]

Referring to parts (a) of FIG. 17 to (b) of FIG. 18, the mounting operation of the developer supply container 1 to the developer receiving apparatus 8 will be described. Part (a) of FIG. 17 shows a state before the engaged portion 11*b* is held by the holding portion 131 when the developer supply container 1 is inserted, and part (b) of FIG. 17 shows a state when the engaged portion 11*b* is held by the holding portion 131 as the developer supply container 1 is inserted. Part (a) of FIG. 18 illustrates a state when the engaged portion 11*b* is positioned above the engaging portion 130 as the developer supply container 1 is inserted, and part (b) of FIG. 18 illustrates a state when the engaged portion 11*b* is positioned at the extension portion 142 when the developer supply container 1 is completely mounted.

The developer supply container 1 is inserted into image forming apparatus 100, as shown in part (a) of FIG. 17, the developer supply container 1 is moved in the mounting direction A. At this time, the holding portion 131 and the engaged portion 11*b* have not yet been engaged. Until this point, the position of the flange portion 3 and the shutter 4 are not displaced relative to each other, and the container discharge opening 3*a*4 is sealed by the developer sealing portion 4*a* of the shutter 4. At this time, as shown in part (a) of FIG. 12, the stopper portions 4*b* and 4*c* are engaged with the shutter stopper portions 8*a* and 8*b* of the developer receiving apparatus 8, and the position of the shutter 4 in the mounting direction A is fixed with respect to the developer receiving apparatus 8. Therefore, even if the developer supply container 1 is moved in the mounting direction A after this, in the mounting direction A, the shutter 4 moves relative to the developer supply container 1 except the shutter 4, but and does not move relative to the developer receiving portion 11 in the insertion/removal direction.

When the developer supply container 1 is further moved in the mounting direction A, the engaged portion 11*b* is held in contact with the holding portion 131 as shown in part (b) of FIG. 17. Here, the structure is such that the position of the engaged portion 11*b* is positioned (in the direction U) above the center of the rotation shaft 141. By this, the engaged portion 11*b* is held by the holding portion 131 and displaced in the upward direction U in accordance with the mounting operation of the developer supply container 1. At this point of time, the position of the shutter 4 and the flange portion 3 is displaced relative to each other, but the position of the receiving opening 11*a* remains at the initial position and is not in contact with the shutter 4.

Here, the circumferential length of the tooth crest surface of the tooth 132 is selected to be sufficiently shorter than the diameter of the engaged portion 11*b*. For this reason, as the developer supply container 1 is mounted, the engaged portion 11*b* comes into contact with the tooth crest surface of the tooth 132 just before it is held by the holding portion 131, so that even if it is momentarily not engaged with the holding portion 131, the engaging portion 130 is easily rotated and the engaged portion 11*b* becomes held by the holding portion 131. In addition, the teeth 132 are provided at regular intervals around the engaging portion 130. For this reason, the holding portion 131 and the engaged portion 11*b* are engaged irrespective of the phase of the engaging portion 130, and therefore, no structure for regulating the position of the engaging portion 130 is necessary.

When the developer supply container 1 is further moved in the mounting direction A, the engaging portion 130 is pushed by the engaged portion 11*b* in the holding portion 131. By this, a rotational moment is generated in R direction shown in part (b) of FIG. 17, and the engaging portion 130 rotates. By this, the developer receiving portion 11 is displaced in the upward direction U along the wall surface 8*h* of the developer receiving apparatus 8. Thereafter, as shown in part (a) of FIG. 18, the engaged portion 11*b* is lifted to the upper portion of the engaging portion 130. At this time, the developer receiving portion 11 is lifted in the upper direction U from the initial position, and the receiving opening 11*a* comes into contact with the shutter opening 4*j* of the shutter 4. In this state, the shutter opening 4*j* and the container discharge opening 3*a*4 do not communicate with each other, and therefore, the developer accommodated in the developer supply container 1 is not discharged to the developer receiving apparatus 8.

When the developer supply container 1 is further moved in the mounting direction A and the developer supply container 1 is pushed to the mounting completion position, the engaging portion 130 rotates, so that the engaged portion 11*b* rides on the extension portion 142 from the holding portion 131 as shown in part (b) of FIG. 18. By this, the vertical position of the developer receiving portion 11 is maintained. The developer receiving portion 11 is urged in the downward direction D by the urging member 12, and therefore, the holding portion 131 does not separate from the engaged portion 11*b* during the rotation. In addition, the receiving opening 11*a* and the shutter opening 4*j* move relative to the flange portion 3 while being in contact with each other, and brought into communication with the container discharge opening 3*a*4. In this state, the container discharge opening 3*a*4, the shutter opening 4*j*, and the receiving opening 11*a* are in a fluid communication state, and therefore, it is possible to supply the developer from the developer supply container 1 to the developer receiving apparatus 8. By this process, the container discharge opening 3*a*4 and the shutter opening 4*j* are brought into fluid communication with each other, and the container discharge opening 3*a*4, the shutter opening 4*j*, and the developer receiving opening 11*a* are in fluid communication with each other. At this time, the extension portion 142 is parallel to the mounting direction A of the developer supply container 1. For this reason, the developer receiving portion 11 including the engaged portion 11*b* is not lifted beyond the state in contact with the shutter 4, and therefore, no excessive force is applied on the engaged portion 11*b* and so on. Here, as shown in part (b) of FIG. 18, the positional relation between the container discharge opening 3*a*4 and the extension portion 142 is such that a plane L passing through the container discharge opening 3*a*4 and perpendicular to the rotation axis P passes through the extension portion 142. In addition, the plane containing the extension portion 142 lies between the axis of rotation P and the container discharge opening 3*a*4.

On the other hand, when removing the developer supply container 1 mounted to the apparatus main assembly 100*a*, the developer supply container 1 is displaced in the dismounting direction B from the state shown in part (b) of FIG. 18. The engaged portion 11*b* on the extension portion 142 moves relative to the extension portion 142 to engage with the holding portion 131, and the state shown in part (a) of FIG. 18 is established. Thereafter, as shown in part (b) of FIG. 17, as the engaging portion 130 rotates, the developer receiving portion 11 moves in the downward direction D as the engaging portion 130 rotates to a movable position. At this time, the developer receiving portion 11 is urged in the downward direction D by the urging member 12, and therefore, The engaging portion 130 rotates without separating the holding portion 131 and the engaged portion 11*b* as in the case of mounting the state transitions to the state shown in part (a) of FIG. 17. In addition, when removing the developer supply container 1, the developer receiving portion 11 is urged in the downward direction D by the urging member 12, and therefore, the developer supply container 1 is urged in the dismounting direction B by way of the engaging portion 130, so that the required operating force can be reduced. By this, the user takes the used developer supply container 1 out in the dismounting direction B and inserts the new developer supply container 1 in the mounting direction A, only by which the engaging portion 130 is automatically displaced so that the developer supply container 1 can be exchanged, and therefore, the replacing operation is easy.

Next, referring to part (a) of FIG. 17 to part (b) of FIG. 19, the effect of the structure using the engaging portion 130 will be described in detail. Part (a) of FIG. 19 is an illustration of the force relationship of the developer receiving portion 11 in the structure of the comparative example. The engaged portion 11*b* of the developer receiving portion 11 comes into contact with the inclined portion 3*f* which is inclined at a certain angle θ and moves along the wall surface 8*h*. Here, a force (operating force) for inserting the developer supply container 1 (flange portion 3) is F; a normal force received by the engaged portion 11*b* from the inclined portion 3*f* is N1; a normal force received from the wall surface 8*h* is N2; and the force (drag) required to lift portion 11 upward U is T. Then, as explained above (part (a) in FIG. 10), the following expression holds.

$$F=\tan\theta\cdot T=A\cdot T$$

In addition, part (b) of FIG. 19 is an illustration of the force relation of the developer receiving portion 11 in Embodiment 2. The engaged portion 11*b* of the developer receiving portion 11 abuts to the holding portion 131 and the engaging portion 130 rotates, by which the developer receiving portion 11 moves along the wall surface 8*h*. Here, the force (operating force) for inserting the developer supply container 1 (flange portion 3) is F, the perpendicular resistance received by the engaging portion 130 from the rotation shaft 141 is N1, the normal reaction force received by the developer receiving portion 11 from the wall surface 8*h* is N2. In addition, when the force (drag) required to lift the developer receiving portion 11 in the upward direction U is T, and the phase formed by the engaging portion 130 and the engaged portion 11*b* is a, the force relationship is as shown on the left of part (b) of FIG. 19. Since the developer receiving portion 11 and the engaged portion 11*b* are an integrated rigid body, a resistance T is deemed as being applied to the engaged portion 11*b*. Since the flange portion 3 and the rotation shaft 141 are an integral rigid body, the operating force F is deemed as being applied to the rotation shaft 141. In addition, since the engaged portion 11*b* moves integrally with the holding portion 131, when the engaged portion 11*b* and the holding portion 131 are deemed as being an integral engaging portion 130A, the force relationship at the engaging portion 130A is as shown on the right of part (b) of FIG. 19. At this time, when a linear distance between the rotation shaft 141 and the engaged portion 11*b* is L, the distance L is much larger than the diameter of the rotation shaft 141 and the engaged portion 11*b*, and therefore, the following equation holds.

$$F=N2$$

$$N1=T$$

$$T\cdot\cos\alpha=N2\cdot\sin\alpha$$

From the above three equations, the following equation holds.

$$F=T/\tan\alpha=B\cdot T$$

From the above relationship, the relationship between θ and the coefficient A for the comparative example, the relationship between θ and the coefficient B for Embodiment 2 are obtained, and the result is shown in FIG. 20. As shown in FIG. 20, in the structure of the comparative example, as an inclination angle θ increases, the operating force F also increases. On the other hand, in the structure of Embodiment 2, with the rotation, the force F becomes large once (up to inflection point), and then the operation force F decreases with the rotation. Therefore, the operating force F can be reduced by setting an initial phase of Embodiment 2 to not less than al than the angle θ1 of the inclined portion 3*f* in the comparative example.

As described above, also with the developer supply container 1 of this embodiment, the operation force when mounting/dismounting the developer supply container 1 to/from the image forming apparatus 100 is reduced, the operation is smooth, and operability is improved.

Here, in the above-described Embodiment 1, the engaging portion 30 has the arm shape including one holding portion 31, and in Embodiment 2, the engaging portion 130 has the gear shape including a plurality of holding portions 131, but the relationship between the number and shape of the holding portion is not limited to these. For example, the arm shape including a plurality of holding portions may be used, or a disk shape including one holding portion on a circumference may be employed. As for the shape, it is possible to employ a suitable shape such as an elliptical shape or a polygonal shape.

INDUSTRIAL APPLICABILITY

According to the present invention, the developer supply container and a developer supplying system, which can reduce the operating force at the time mounting and in which the operability is improved.

REFERENCE NUMERALS

1 developer supply container; 2*c* developer casing portion; 4*j* shutter opening (discharge opening); 8 developer receiving device; 11 developer receiving portion; 11*a* receiving opening; 11*b* engaged portion; 30 engagement portion; 30*a* base end portion; 30*b* free end portion; 31 holding portion; 32 extension portion; 41 rotation shaft; 130 engagement portion; 131 holding portion; 141 rotation shaft; 142 extension portion; 200 developer supplying system; 300 discharge portion; A mounting direction; U upward direction (displacing direction).

The invention claimed is:

1. A developer supply container comprising:

a rotatable developer accommodating body configured to accommodate developer, the rotatable developer accommodating body being provided with a gear portion rotatable about a first rotational axis;

a discharging body in fluid communication with the rotatable developer accommodating body, with the rotatable developer accommodating body being rotatable about the first rotational axis and relative to the discharging body, and with the discharging body being provided with a discharge opening configured to permit discharging of the developer to outside of the developer supply container; and a rotatable portion provided at a side of the discharging body so as to be rotatable about a second rotational axis extending in a direction crossing a direction of the first rotational axis, the rotation of the rotatable portion being in a vertical direction when the developer supply container is oriented with the discharge opening positioned at a bottom side of the discharging body, and with the rotatable portion being rotatable between a first position and a second position.

2. A developer supply container according to claim 1, further comprising a first protruding portion provided on the discharging body so as to protrude from the discharging body and extend in the direction of the second rotational axis, the first protruding portion being configured to abut the rotatable portion so as to regulate, when the rotatable portion is in the first position, a rotation of the rotatable portion in a first rotational direction; and a second protruding portion provided on the discharging body so as to protrude from the discharging body and extend in the direction of the second rotational axis, the second protruding portion being configured to abut the rotatable portion so as to regulate, when the rotatable portion is in the second position, a rotation of the rotatable portion in a second rotational direction that is opposite to the first rotational direction.

3. A developer supply container according to claim 1, wherein the rotatable portion includes a recess.

4. A developer supply container according to claim 3, further comprising a first protruding portion provided on the discharging body so as to protrude from the discharging body and extend in the direction of the second rotational axis, the first protruding portion being configured to abut the rotatable portion so as to regulate, when the rotatable portion is in the first position, a rotation of the rotatable portion in a first rotational direction; and a second protruding portion provided on the discharging body so as to protrude from the discharging body and extend in the direction of the second rotational axis, the second protruding portion being configured to abut the rotatable portion so as to regulate, when the rotatable portion is in the second position, a rotation of the rotatable portion in a second rotational direction that is opposite to the first rotational direction, wherein the first protruding portion and the second protruding portion are provided on the discharging body such that (i) a position of the recess of the rotatable portion when the rotatable portion is positioned at the first position is located above a rotation center of the rotatable portion in the vertical direction and (ii) a position of the recess of the rotatable portion when the rotatable portion is positioned at the second position is located above the position of the recess of the rotatable portion when the rotatable portion abuts the first protruding portion at the first position in the vertical direction.

5. A developer supply container according to claim 3, wherein the rotatable portion has an arm shape including the recess at an end portion of the rotatable portion.

6. A developer supply container according to claim 2, further comprising a spring configured to urge the rotatable portion to the first protruding portion.

7. A developer supply container according to claim 2, wherein the first protruding portion is positioned between a front end of the developer supply container and a rotation center of the rotatable portion with respect to the direction of the first rotational axis, and the second protruding portion is positioned between the first protruding portion and the gear portion with respect to the direction of the first rotational axis.

8. A developer supply container according to claim 7, wherein the discharge opening is positioned between the rotation center of the rotatable portion and the gear portion with respect to the direction of the first rotational axis.

9. A developer supply container according to claim 1, further comprising a shutter configured to be slidable relative to the discharging body in the direction of the first rotational axis between an open position wherein the discharge opening is open and a closed position where the developer discharge opening is closed by the shutter.

10. A developer supply container according to claim 4, further comprising a rotation shaft as the rotation center of the rotatable portion, the rotation shaft being configured to protrude from the discharging body and extend in the direction of the second rotational axis.

* * * * *